(12) United States Patent
Unno

(10) Patent No.: US 7,679,768 B2
(45) Date of Patent: Mar. 16, 2010

(54) IMAGE PROCESSING APPARATUS AND METHOD

(75) Inventor: Kouichi Unno, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1044 days.

(21) Appl. No.: 11/368,613

(22) Filed: Mar. 7, 2006

(65) Prior Publication Data

US 2006/0203284 A1 Sep. 14, 2006

(30) Foreign Application Priority Data

Mar. 8, 2005 (JP) .............................. 2005-064402

(51) Int. Cl.
*G06F 15/00* (2006.01)
*G07G 1/14* (2006.01)

(52) U.S. Cl. ........................................ 358/1.15; 705/14
(58) Field of Classification Search ............... 358/1.15, 358/1.13, 1.14, 1.16, 1.18, 1.1, 1.9, 1.12, 358/440, 403; 382/239, 167, 101, 232; 375/240.03; 700/121, 7, 97, 288, 67; 709/206, 207, 224; 705/1, 14, 26; 270/1.03, 45
See application file for complete search history.

(56) References Cited

U.S. PATENT DOCUMENTS 6,041,144 A * 3/2000 Sugiura ...................... 382/239

2002/0143883 A1 * 10/2002 Miyake et al. .............. 709/206
2004/0179239 A1 9/2004 Yamazaki et al. ............. 358/21

FOREIGN PATENT DOCUMENTS

JP 2000-305744 2/2000

* cited by examiner

*Primary Examiner*—Saeid Ebrahimi Dehkordy
(74) *Attorney, Agent, or Firm*—Fitzpatrick, Cella, Harper & Scinto

(57) ABSTRACT

An image processing apparatus enables efficient use of an image memory area according to processing contents set by a user. A CPU searches destinations set sequentially, and makes for each destination an image area information generating decision for searching for a destination that generates an image a printer section possibly output. After completing the image area information generating decision for all the destinations, the CPU decides whether the image area information is to be generated or not in the end. When it decides that the image area information is to be generated, it sets a compression rate of a compression expansion circuit of an image compression expansion section at a higher value, and simultaneously enables the output of the image area data buffer. When it decides that the image area information is not to be generated, it sets the compression rate of the compression expansion circuit of the image compression expansion section at a lower value, and simultaneously disables the output of the image area data buffer.

11 Claims, 22 Drawing Sheets

IMAGE PROCESSING APPARATUS AND METHOD

BACKGROUND OF THE INVENTION

1. Field of the Invention

The present invention relates to an image processing apparatus and method, and more particularly to an image processing for using an image memory area efficiently.

2. Description of Related Art

Recently, with the cost reduction of memories and hard disks and the performance enhancement of CPUs, apparatuses have been spread which can carry out a plurality of functions simultaneously with a single image input/output unit. In addition, with the spread of computers and networks, connecting a network interface to the image input/output unit enables the transmission and reception of image data through the networks. Specifically, copying machines have been proposed which read a document with an optical reader, store image data passing through analog-to-digital conversion in a hard disk, and then send the image data stored in the hard disk to a destination a user designates by fax, or carry out copying or printing the user designates. In addition, copying machines can have a network interface, in which case functions such as sending the stored image data to a designated computer via a network can be installed. In contrast, such functions can be installed as generating and outputting image data according to a printer description language that is output from a computer.

As image data the copying machines handle, there are a lot of examples such as documents read by optical readers of the copying machines and image data based on the printer description languages fed from the computers. Recently, however, since users can produce color data easily because of the cost reduction and performance improvement of the computers, the image data handled by the copying machine are shifting from the black-and-white image data to color image data.

Generally, the color image data have a data quantity twice or more than that of the black-and-white image data. Accordingly, when the copying machine handles the color image data, the data quantity greatly increases. Thus, the image data are stored in a memory with being subjected to irreversible compression, and the processing at the transmission to the computer via the network or at printing is carried out through the expansion of the compressed image data. In addition, to perform optimum image processing at the color image printing, image processing adjustment at the printing is performed by deciding image area information about colors and characters on each page of the color image data (for example, see Japanese patent application laid-open No. 2000-305744).

As for these processings, a designation of the user enables a plurality of processings to be carried out collectively. More specifically, the image data read by the optical reader of the copying machine are stored in the hard disk and are transmitted to computers on the network, followed by a print instruction of the image data stored in the hard disk by the user. This makes it possible to print the irreversible compressed image data in the hard disk by expanding the image data. Normally, the data stored in this case are only one kind of the irreversible compressed image data. Thus, to perform transmission or printing, the irreversible compressed image data must undergo color space conversions or image format conversions at the expansion according to the uses. This is because to generate and store the image data for each of the individual uses, a plurality of image data must be generated for the individual uses. This will result in the consumption of a large amount of image memory for each user designation, which can bring about interruptions of the processings of other users.

Although the irreversible compression of the color image as described above can reduce the image capacity of the color image data, the expansion offers a problem of deteriorating the image quality as compared with the original image data. To print such image data, screen processing is performed on the image data at the printing, which makes the deterioration of the image quality inconspicuous. However, to send the image data to a computer or by FAX via the network or public telephone circuit as digital data, the data that are not subjected to the screen processing are sent. Accordingly, when looking at the image on a receiving side unit, the degradation in the image quality becomes conspicuous. In particular, in JPEG generally used as the irreversible compression of color images, since the processing is carried out on a block by block basis in the compression process, block noise is easy to take place.

On the other hand, to suppress such degradation in the image quality, reducing the compression rate at the irreversible compression is effective. This, however, has a problem of increasing the memory capacity after the compression.

The present invention is implemented to solve the foregoing problems. It is therefore an object of the present invention to provide an image processing apparatus and method capable of using the image memory area efficiently in accordance with the processing content the user sets.

SUMMARY OF THE INVENTION

To accomplish the objects, an image processing apparatus in accordance with the present invention comprises: reading means for reading image data; image area information generating means for producing image area information from the image data; compression means for compressing the image data; storing means for storing the compressed image data; setting means for setting a transmission destination to which the image data is transmitted; decision means for making a decision as to whether the image area information is necessary or not according to the transmission destination that is set; and control means for controlling, when the decision means makes a decision that the image area information is not necessary, the compression means in such a manner as to compress the image data at a compression rate lower than a compression rate when a decision is made that the image area information is necessary.

In addition, an image processing method in accordance with the present invention comprises: a reading step of reading image data; an image area information generating step of producing image area information from the image data; a compression step of compressing the image data; a step of storing the compressed image data in storing means; a step of setting a transmission destination to which the image data is transmitted; a decision step of making a decision as to whether the image area information is necessary or not according to the transmission destination that is set; and a control step of controlling, when the decision step makes a decision that the image area information is not necessary, the compression step in such a manner as to compress the image data at a compression rate lower than a compression rate when a decision is made that the image area information is necessary.

The above and other objects, effects, features and advantages of the present invention will become more apparent from the following description of embodiments thereof taken in conjunction with the accompanying drawings.

DETAILED DESCRIPTION OF THE PREFERRED EMBODIMENTS

The invention will now be described with reference to the accompanying drawings.

Embodiment 1

Figure 1:
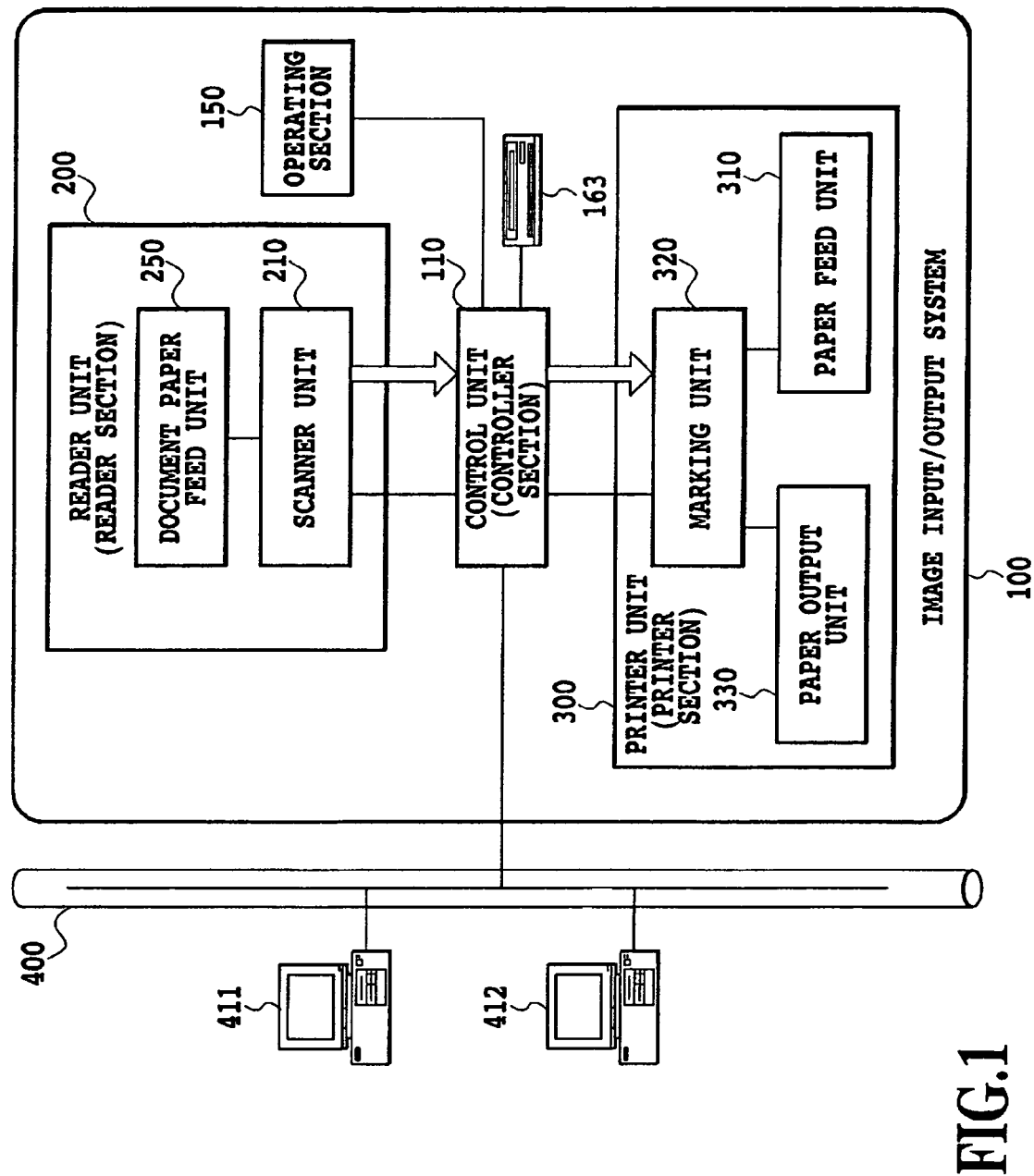
FIG. 1 is a block diagram showing an entire configuration of an apparatus of an embodiment in accordance with the present invention.

FIG. 1 is a block diagram showing a general configuration of an image input/output system 100 of an embodiment in accordance with the present invention. A reader section 200 serving as a reading means includes a scanner unit 210 with a function of reading a document by reading a document image optically and converting it to image data, and a document paper feed unit 250 with a function of conveying document paper.

A printer section 300 forms a visible image on recording paper from the image data with conveying the recording paper, and ejects the paper to the outside of the apparatus. The printer section 300 includes a paper feed unit 310 having a plurality of types of recording paper cassettes, and a marking unit 320 with a function of transferring and fixing the image data on the recording paper. In addition, the printer section 300 includes a paper output unit 330 with a function of sorting or stapling the printed recording papers and outputting to the outside of the apparatus.

A controller section 110 is electrically connected with the reader section 200 and printer section 300, and is connected with host computers 411 and 412 via a network 400. The controller section 110 offers a copy function by reading the image data of a document with controlling the reader section 200, and by outputting the image data onto the recording paper with controlling the printer section 300. In addition, the controller section 110 offers a scanner function of converting the image data read from the reader section 200 to code data, and transmitting it to the host computers via the network 400. Furthermore, the controller section 110 offers a printer function of converting the code data received from the host computers via the network 400 to the image data, and of outputting the image data to the printer section 300.

Figure 2:
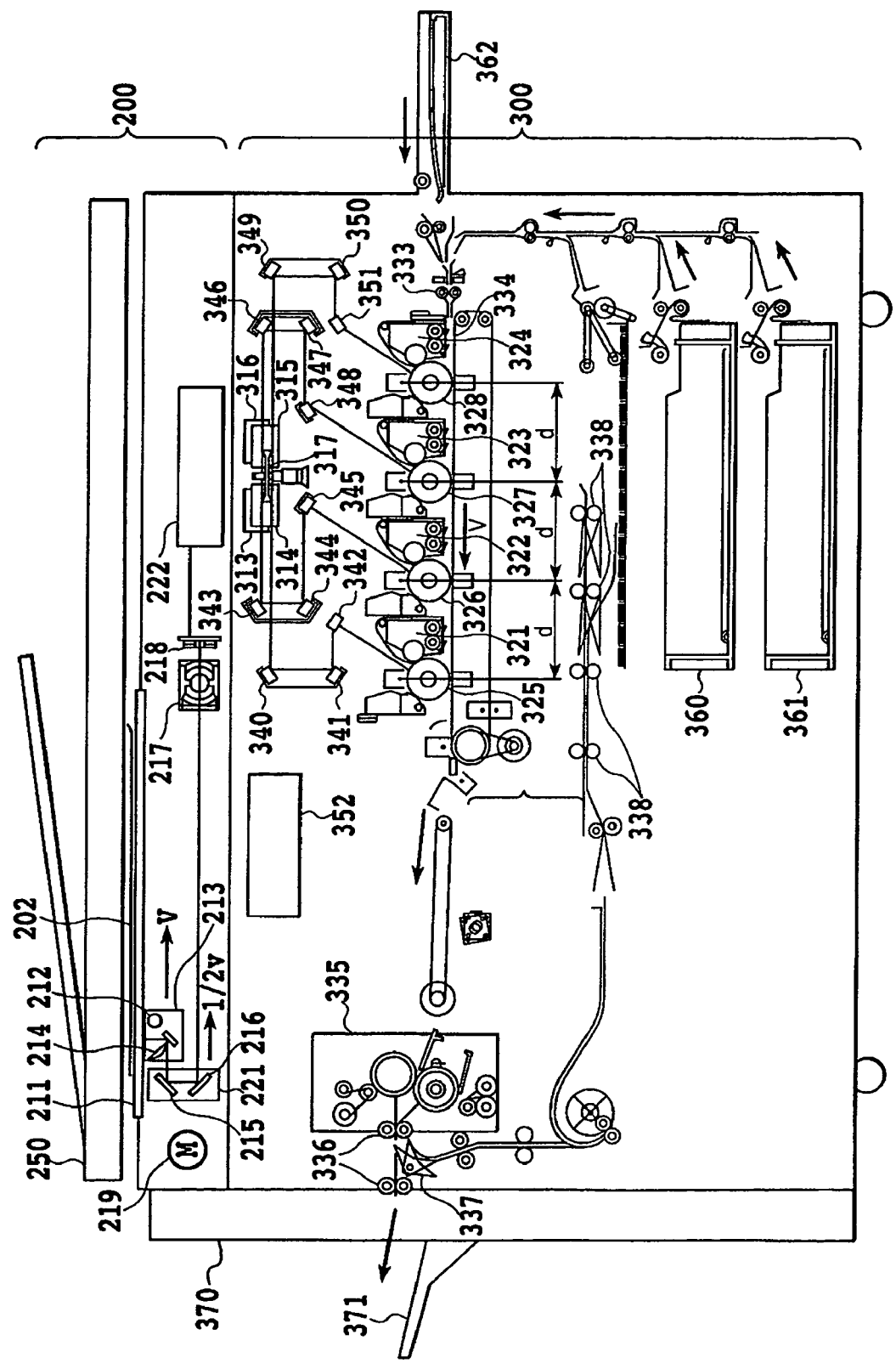
FIG. 2 is a general view of a reader section and printer section of the present embodiment.

An operating section 150, which includes a liquid crystal touch panel, offers a user I/F for a user to control the image input/output system 100, and is connected to the controller section 110. FIG. 2 is a general view of the reader section 200 and printer section 300 of the present embodiment. A document feed/convey unit 250 of the reader section feeds and conveys the documents one by one from the top onto a platen glass 211, and ejects the document on the platen glass 211 to the outside after completing the read operation of the document. When the document is conveyed to the platen glass 211, a lamp 212 is turned on and the movement of an optical unit 213 is started to carry out exposure scanning of the document. The reflected light from the document is led to a CCD image sensor (called "CCD" from now on) 218 through mirrors 214, 215 and 216 and a lens 217. Thus, the CCD 218 reads the image of the document scanned.

Figure 4:
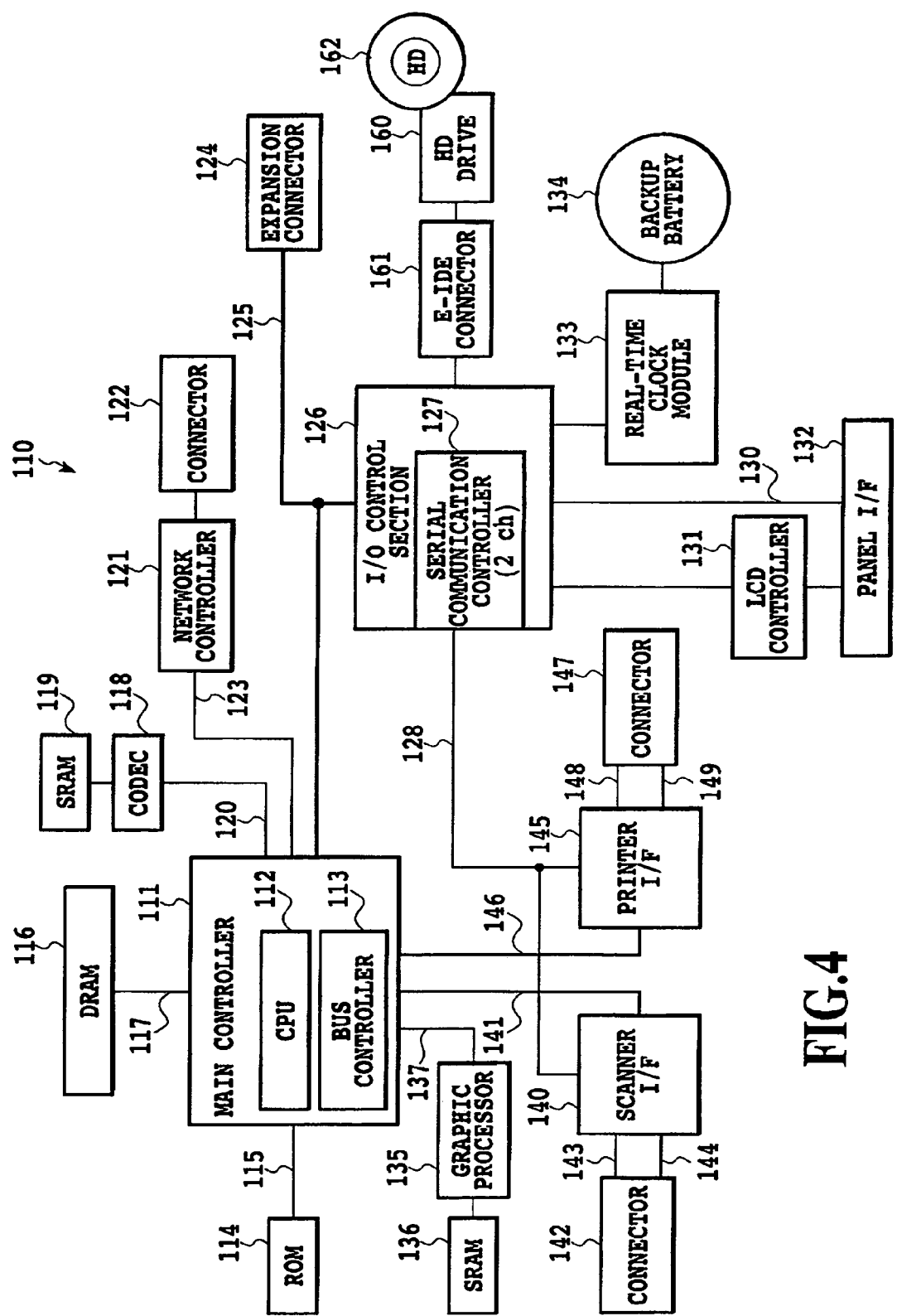
FIG. 4 is a block diagram showing a configuration of a reader image processing section of the embodiment in accordance with the present invention.

A reader image processing section 222 applies prescribed processing to the image data output from the CCD 218, and outputs it to the controller section 110 via a scanner I/F 140 (FIG. 4). A printer image processing section 352 supplies a laser driver 317 with an image signal fed from the controller section 110 via a printer I/F 145 (FIG. 4). The laser driver 317 of the printer section 300 drives laser light emitting sections 313, 314, 315 and 316 to cause them to emit laser beams corresponding to the image data output from the printer image processing section 352. The laser beams are shed on photoconductive drums 325, 326, 327 and 328 by mirrors 340, 341, 342, 343, 344, 345, 346, 347, 348, 349, 350 and 351. Thus, latent images corresponding to the laser beams are formed on the photoconductive drums 325, 326, 327 and 328. Developing units 321, 322, 323 and 324 develop the latent images with black (Bk), yellow (Y), cyan (C) and magenta (M) toners, and transfer the toners of the individual colors onto a paper, thereby carrying out full-color print.

The paper fed from one of the paper cassettes 360 and 361 and manual-bypass tray 362 in synchronism with the start of the laser beam radiation passes through a resisting roller 333, and is conveyed with being absorbed onto a transferring belt 334. Then the developers adhered to the photo conductive drums 325, 326, 327 and 328 are transferred to the recording paper. The recording paper to which the developers are transferred is conveyed to a fixing section 335 so that the developers are fixed on the recording paper by the heat and pressure of the fixing section 335. The recording paper passing through the fixing section 335 is ejected by an output roller 336. A paper output unit 370 assorts the recording papers by bundling them, or carries out the staple processing of the assorted recording papers.

In addition, in the case of double-sided recording, when the recording paper is conveyed to the output roller 336, the rotation of the output roller 336 is reversed so that the recording paper is guided to a paper refeed conveying path 338 with a flapper 337. The recording paper led to the paper refeed conveying path 338 is fed to a transferring belt 334 at the above-mentioned timing.

<Explanation of Reader Image Processing Section>

Figure 3:
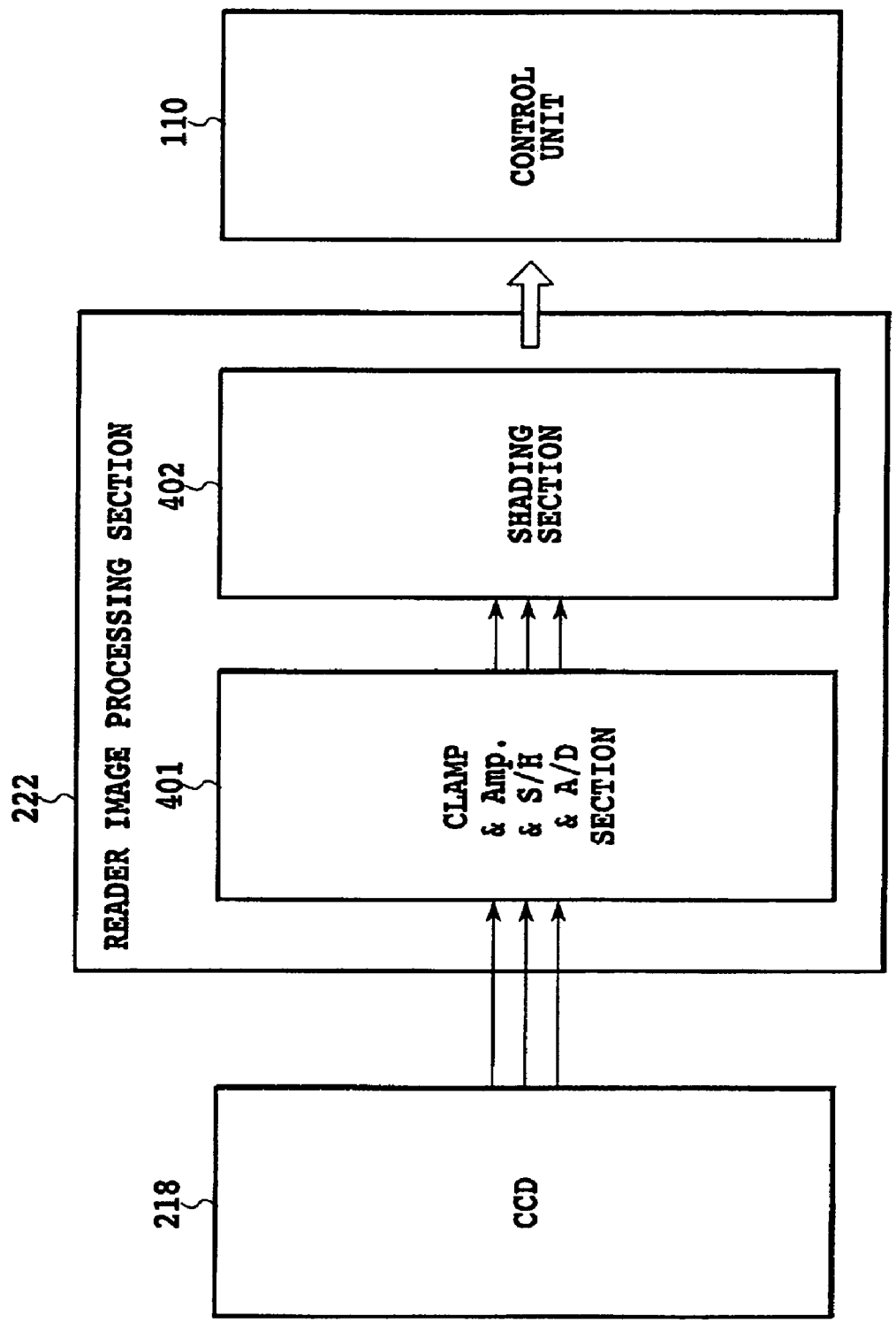
FIG. 3 is a block diagram showing a detailed configuration of a reader image processing section of the embodiment in accordance with the present invention.

FIG. 3 is a block diagram showing a detailed configuration of the reader image processing section 222 of the embodiment in accordance with the present invention. The reader image processing section 222 processes the signals read from the document on the platen glass 211 by the CCD 218, and converts them to electric signals. When the CCD 218 is a color sensor, it may be a single-line CCD in which RGB color filters are disposed in-line in this order. Alternatively, the CCD 218 may be a three-line CCD, in which R filters/G filters/B filters are disposed in the respective CCDs. Besides, the CCD 218 may be that whose filters are made on-chip, or are constructed separately from the CCD. The electric signals (analog image signals) are input to the image processing section 222, and undergo the sample-and-hold (S/H) by a clamp&Amp.&S/H&A/D section 401. Subsequently, the signals are clamped using the dark level of the analog image signal as a reference voltage, are amplified to a prescribed level (the processing order is not always the above-mentioned order), and are A/D converted to 8-bit RGB digital signals. The RGB signals undergo shading correction and black correction by a shading section 402, and are output to the controller section 110.

<Explanation of Controller Section>

The functions of the controller section 110 will be described with reference to the block diagram of FIG. 4. A main controller 111 consists chiefly of a CPU 112, a bus controller 113, and a variety of I/F controller circuits. The CPU 112 and bus controller 113 are provided to control the entire operation of the controller section 110. The CPU 112 operates in accordance with a program read from a ROM 114 via a ROM I/F 115. In addition, the operation that interprets PDL (page description language) code data received from a host computer and develops the data to raster image data is described in the program and processed by software. The bus controller 113 controls transfer of data input/output to and from the individual interfaces, and controls arbitration at the bus contention or controls DMA data transfer.

A DRAM 116, which is connected to the main controller 111 via a DRAM I/F 117, is used as a work area for the CPU 112 to operate or a work area for storing the image data. A Codec 118 compresses the raster image data stored in the DRAM 116 according to the MH/MR/MMR/JBIG/JPEG scheme, or reversely expands the compressed and stored code data to the raster image data. An SRAM 119 is used as a temporary work area of the Codec 118. The Codec 118 is connected to the main controller 111 via an I/F 120, and the data transfer between the Codec 118 and DRAM 116 is controlled by the bus controller 113 to undergo the DMA transfer.

A Graphic Processor 135 performs image rotation, image scaling, color space conversion, and binarization of the raster image data stored in the DRAM 116. An SRAM 136 is used as a temporary work area of the Graphic Processor 135. The Graphic Processor 135 is connected to the main controller 111 via an I/F 137, and the data transfer between the processor and the DRAM 116 is controlled by the bus controller 113 to undergo the DMA transfer.

A Network Controller 121 is connected to the main controller 111 via an I/F 123, and to an external network via a connector 122. As the network, Ethernet is a typical example. To a general-purpose high-speed bus 125, are connected an expansion connector 124 for connecting an expansion board, and an I/O control section 126. As the general-purpose high-speed bus, a PCI bus is a typical example.

The I/O control section 126 includes a 2-channel start/stop synchronous serial communication controller 127 for transmitting and receiving control commands to and from the individual CPUs of the reader section 200 and printer section 300, and is connected to external I/F circuits 140 and 145 via an I/O bus 128.

A panel I/F 132, which is connected to the LCD controller 131, includes an I/F for displaying on the liquid crystal screen of the operating section 150, and a key input I/F 130 for inputting data from hard keys or touch panel keys. The operating section 150 includes the liquid crystal display section, a touch panel input device pasted on the liquid crystal display section, and a plurality of hard keys. A signal input from the touch panel or hard keys is fed to the CPU 112 via the foregoing panel I/F 132, and the liquid crystal display section displays the image data sent from a panel I/F 132. The liquid crystal display section displays functions or image data in the operation of the image generating apparatus.

A real-time clock module 133, which is provided for updating and maintaining the date and time managed in the equipment, is backed up by a backup battery 134. An E-IDE interface 161 is provided for connecting the external storage. In the present embodiment, a hard disk drive 160 is connected via the I/F to store the image data to a hard disk 162 or to read the image data from the hard disk 162.

The connectors 142 and 147, which are connected to the reader section 200 and printer section 300, respectively, are composed of start/stop synchronous serial I/Fs 143 and 148 and video I/Fs 144 and 149, respectively. The scanner I/F 140 is connected to the reader section 200 via the connector 142. In addition, the scanner I/F 140 is connected to the main controller 111 via the scanner bus 141, and has a function of applying a prescribed processing to the image received from the reader section 200. Furthermore, it has a function of outputting to the scanner bus 141 a control signal generated from a video control signal fed from the reader section 200. The data transfer from the scanner bus 141 to the DRAM 116 is controlled by the bus controller 113.

The printer I/F 145, which is connected to the printer section 300 via the connector 147, and to the main controller 111 via the printer bus 146, applies a prescribed processing to the image data output from the main controller 111. It has a function of outputting to the printer section 300, and a function of outputting to the printer bus 146 the control signal generated from the video control signal fed from the printer section 300. The transfer of the raster image data developed on the DRAM 116 to the printer section is controlled by the bus controller 113 so that the raster image data are DMA transferred to the printer section 300 via the printer bus 146 and video I/F 149.

<Image Processing by Scanner I/F Section>

Figure 5:
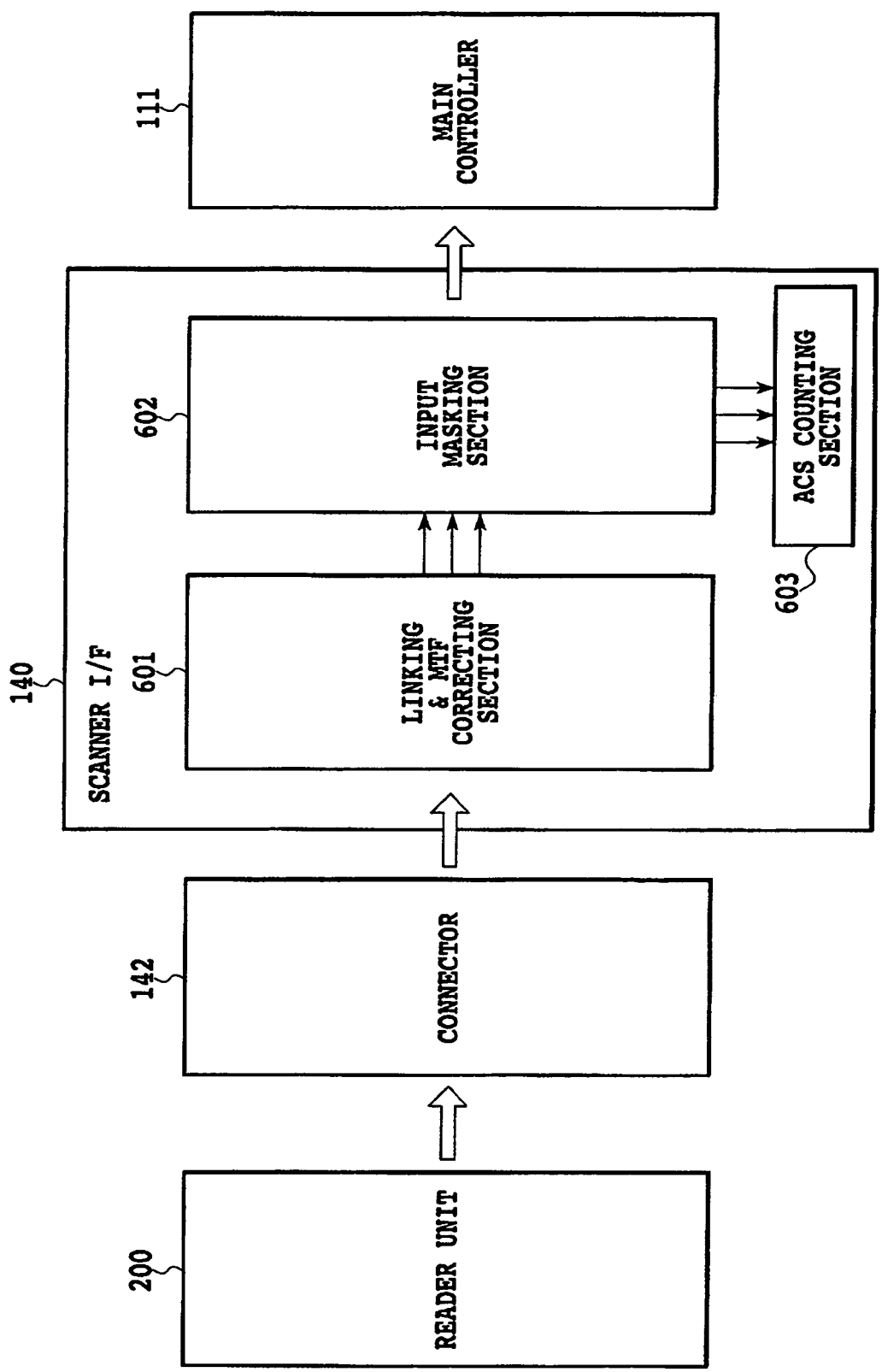
FIG. 5 is a block diagram showing a detailed configuration of a portion carrying out the image processing of a scanner I/F of the embodiment in accordance with the present invention.

The portion for carrying out the image processing of the scanner I/F 140 will be described in detail. FIG. 5 is a block diagram showing a detailed configuration of the portion for carrying out the image processing of the scanner I/F 140 of the embodiment in accordance with the present invention. As for the image signals fed from the reader section 200 via the connector 142, a linking&MTF correcting section 601 adjusts the delay amount of each line in response to a reading rate. This is because when the CCD 218 consists of a 3-line CCD, the linking processing has different reading positions from line to line. Subsequently, the signal timing is corrected so that the 3-line reading positions become identical, and as for the MTF correction, since the MTF of reading varies depending on the reading rate, the variations are corrected. As for the digital signals whose reading position timing is corrected, an input masking section 602 corrects the spectral characteristics of the CCD 218 and the spectral characteristics of the lamp 212 and mirrors 214, 215 and 216. The output of the input masking section 602 is fed to an ACS counting section 603 and to the main controller 111.

<ACS Counting Section>

Figure 6:
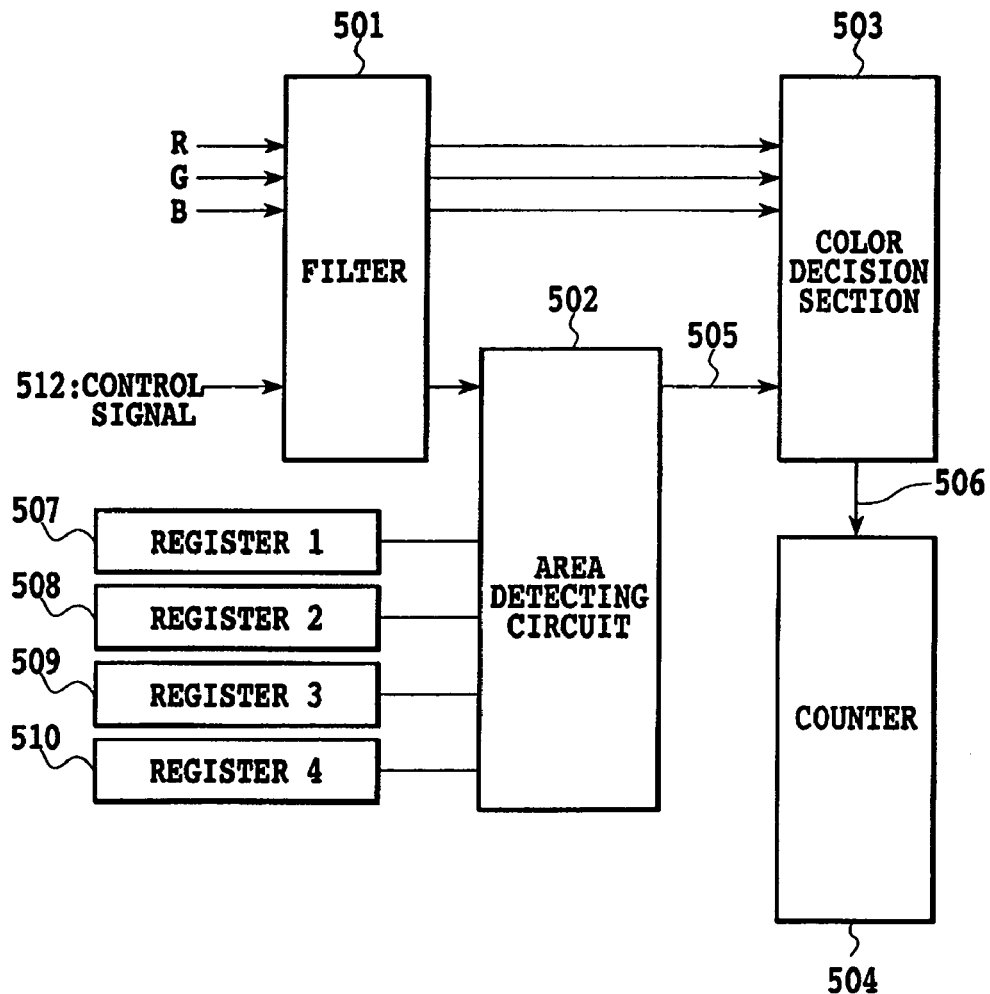
FIG. 6 is a block diagram showing a configuration of a portion relating to the image processing of the scanner I/F of the embodiment in accordance with the present invention.

The ACS (auto-color select) counting section will be described with reference to FIG. 6. The auto-color select (abbreviated to "ACS" from now on) makes a decision as to whether the document is coloror back and white. For example, it makes the color decision by obtaining the saturation of individual pixels and by estimating the number of pixels whose saturation is greater than a particular threshold value. However, even the black-and-white document can have a lot of color pixels around the edges when seen microscopically because of the effect of the MTF, and hence it is difficult to simply make the ACS decision on a pixel by pixel basis.

As for the ACS technique, a variety of methods have been proposed. In the present embodiment, only a general technique will be described without referring to the details of the ACS method. As described above, even the black-and-white image has a large number of color pixels when seen microscopically. Thus, a decision must be made as to whether the pixel is a true color pixel or not from the information on color pixels around the pixel of interest. Accordingly, a filter 501 for this purpose has a FIFO structure for referring to surrounding pixels of the pixel of interest. A circuit 502 is a circuit for generating an area signal 505 for applying the ACS in response to the values set in registers 507-510 which are set by the main controller 111 and to a video control signal 512 fed from the reader section 200.

In response to the area signal 505 for applying the ACS, a color decision section 503 refers to the surrounding pixels of the pixel of interest, which are stored in the memory in the filter 501, and makes a decision as to whether the pixel of interest is a color pixel or black-and-white pixel. A counter 504 counts the number of the color decision signals the color decision section 503 outputs. The main controller 111 decides the area to which the ACS is applied with respect to the reading range, and sets it in the registers 507-510 (the present embodiment has a configuration that determines the range independently of the document). In addition, the main controller 111 compares the value of the counter that counts the number of the color decision signals within the area subjected to the ACS with a prescribed threshold value, and makes a decision as to whether the document is color or black-and-white.

In the registers 507-510, the start position and end position of the decision of the color decision section 503 are set for each of the main scanning direction and subscanning direction in response to the video control signal 512 fed from the reader section 200. The present embodiment sets them smaller than those of the real document by about 10 mm.

<Explanation of Image Processing Section of Printer I/F>

Figure 7:
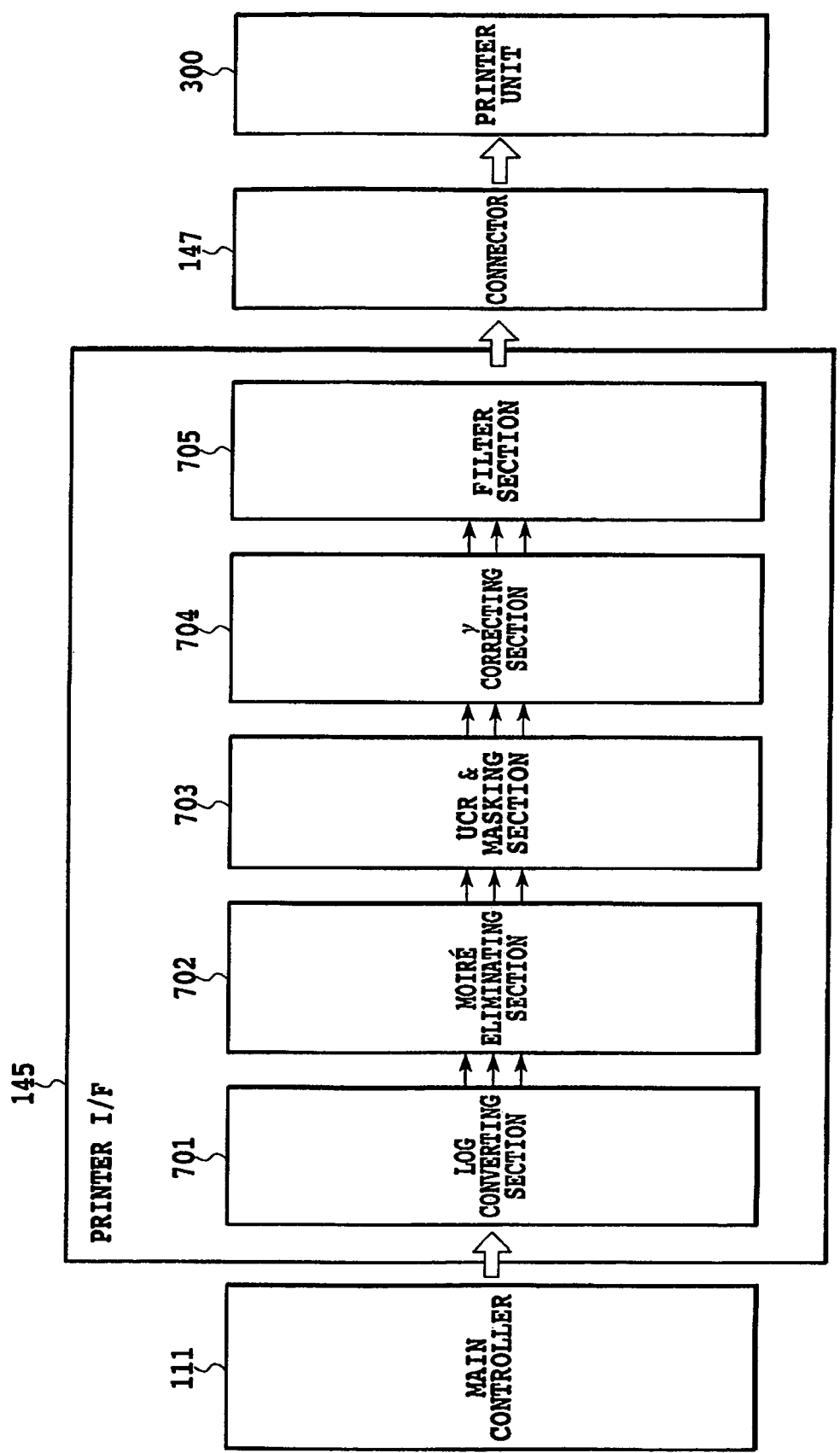
FIG. 7 is a block diagram showing a configuration of a portion relating to the image processing of the printer I/F of the embodiment in accordance with the present invention.

The portion carrying out the image processing in the printer I/F 145 will be described in detail. FIG. 7 is a block diagram showing a detailed configuration of the portion carrying out the image processing in the printer I/F 145 of the embodiment in accordance with the present invention. The image signals fed from the main controller 111 via the printer bus 146 are supplied to a LOG converting section 701, first. The LOG converting section 701 converts the RGB signals to CMY signals according to the LOG conversion. Subsequently, a moire eliminating section 702 eliminates a moiré. A UCR&masking section 703 carries out UCR processing of the CMY signals passing through the moire elimination processing to generate CMYK signals, and the masking processing section corrects them to the signals matching the output of the printer. The signals processed by the UCR&masking section 703 are subjected to gray level adjustment by a γ correcting section 704, followed by smoothing or edge processing by a filter section 705. Passing through these processings, the image is supplied to the printer section 300 via the connector 147.

<Graphic Processor>

Figure 8:
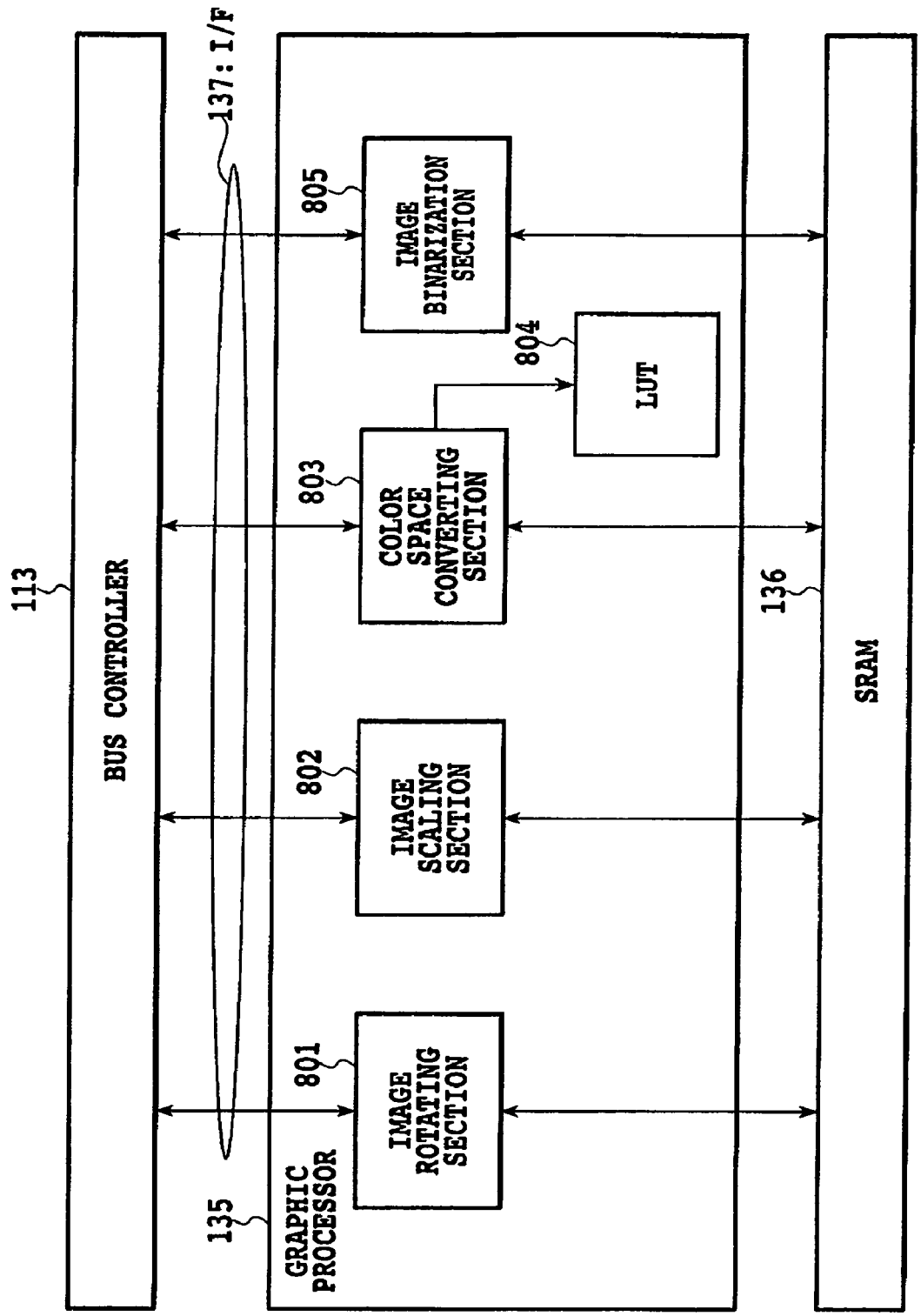
FIG. 8 is a block diagram showing a configuration of a Graphic Processor of the embodiment in accordance with the present invention.

The Graphic Processor 135 will be described in detail. FIG. 8 is a block diagram showing a detailed configuration of the Graphic Processor 135 of the embodiment in accordance with the present invention. The Graphic Processor 135 includes such modules as an image rotating section 801, an image scaling section 802, a color space converting section 803, and a binarization processing section 805. The SRAM 136 is used as a temporary work area of the individual modules of the Graphic Processor 135. To prevent the work areas of the SRAM 136 used by the individual modules from contending, it is assumed that the work areas are statically assigned to the individual modules. The Graphic Processor 135 is connected to the main controller 111 via the I/F 137, and the data between the Graphic Processor 135 and the DRAM 116 are DMA transferred under the control of the bus controller 113.

The bus controller 113 controls the mode setting and the like of the individual modules of the Graphic Processor 135, and controls the timing for transferring the image data to the individual modules.

<Image Rotating Section>

A processing procedure in the image rotating section 801 will be described. The CPU 112 carries out settings for the image rotation control to the bus controller 113 via the I/F 137. According to the settings, the bus controller 113 makes the settings necessary for the image rotation (such as image size, rotation direction/angle) to an image rotating section 801. After the settings needed, the CPU 112 again enables the bus controller 113 to transfer the image data. In response to the permission, the bus controller 113 starts the image data transfer from the DRAM 116 or from the devices connected via the respective I/Fs. Here, it is assumed that the image size for the rotation is 32 pixels×32 lines, and that when the image data are transferred onto the image bus 146, the image transfer is carried out at every 24 bits (for one pixel with 8 bits for each of RGB).

Figure 9:
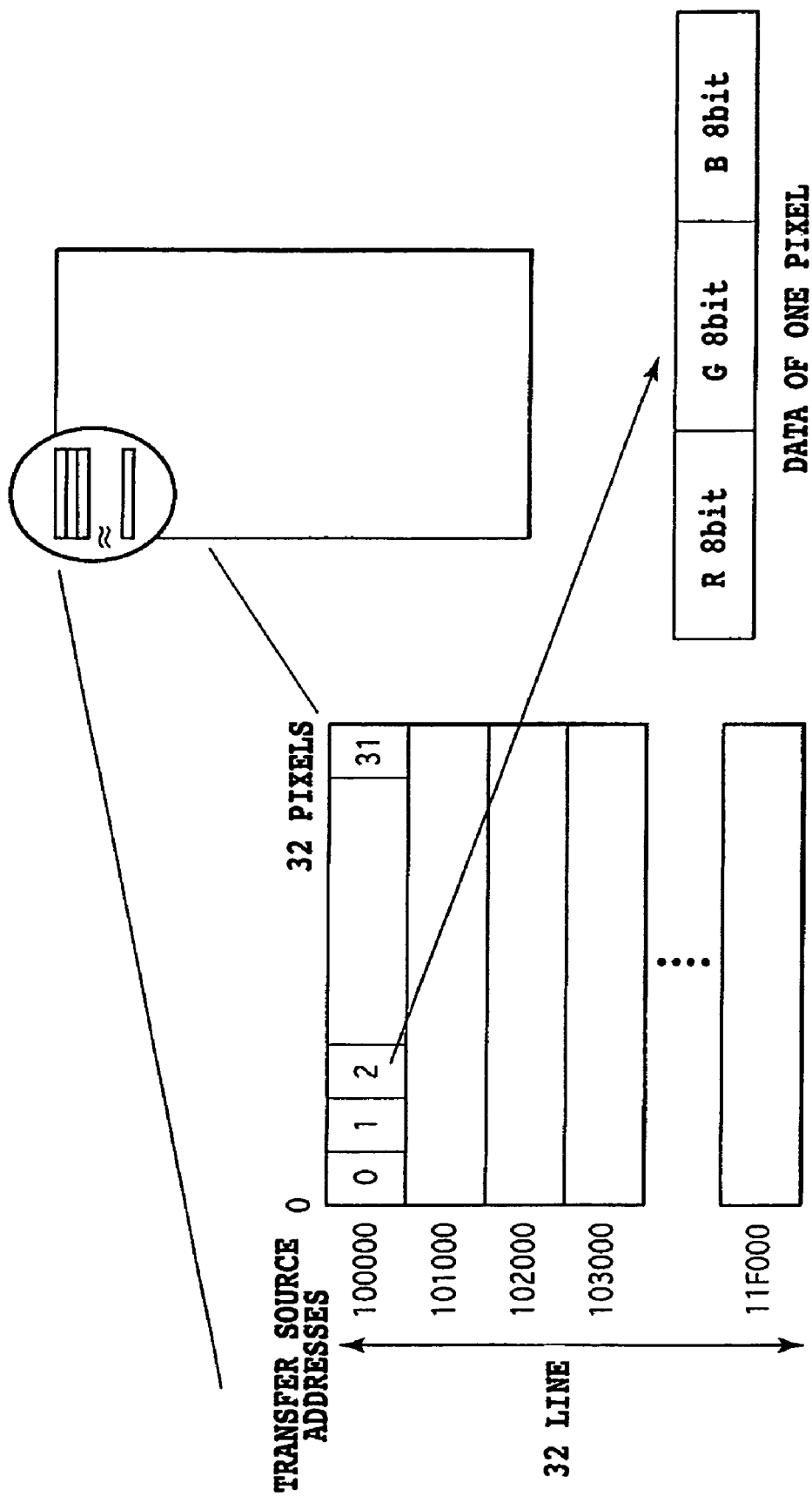
FIG. 9 is a diagram illustrating image data of the embodiment in accordance with the present invention.
Figure 10:
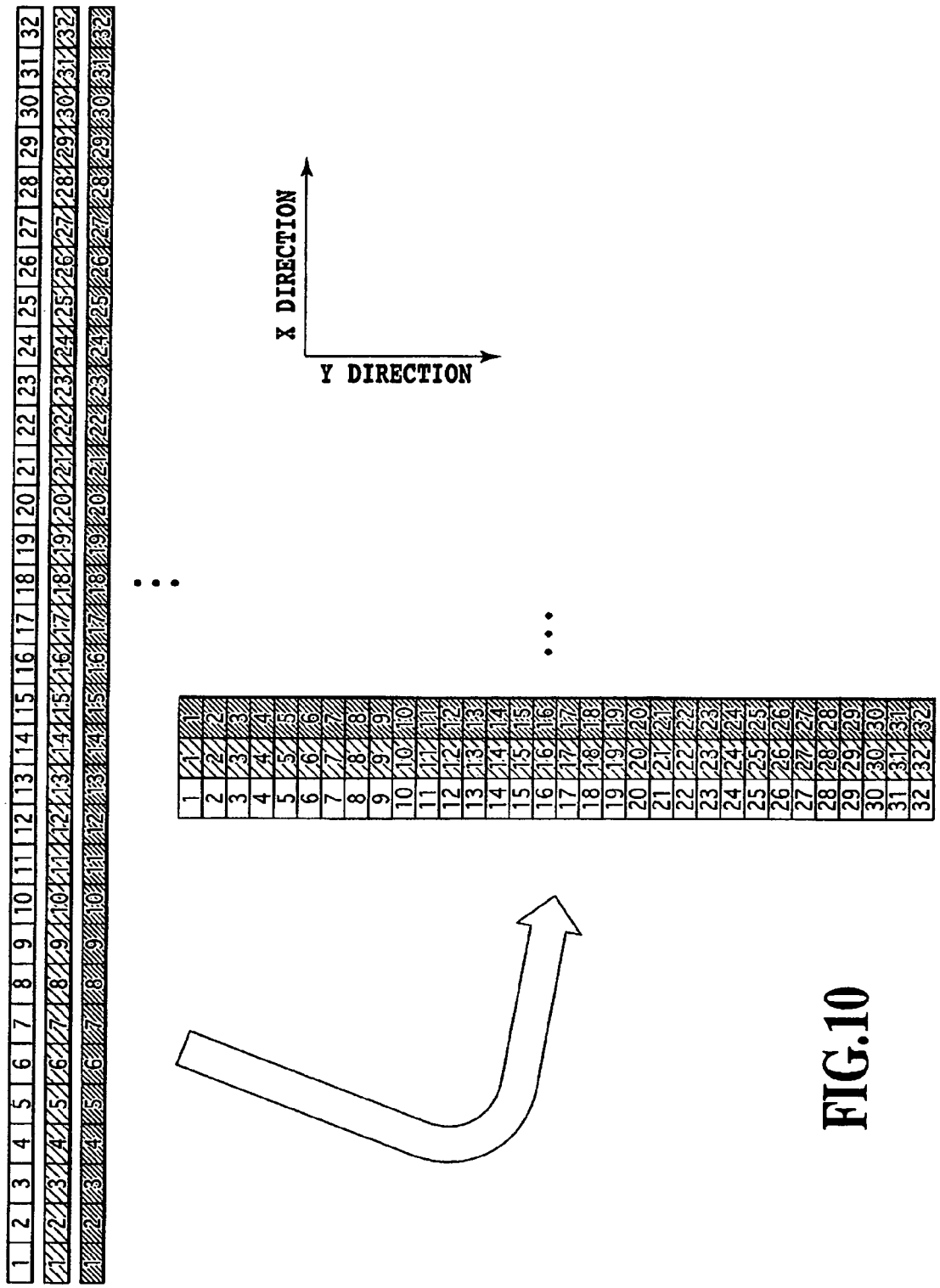
FIG. 10 is a diagram illustrating the operation of an image rotating section of the embodiment in accordance with the present invention.

To obtain the image with 32 pixels×32 lines as mentioned above, the data transfer with the foregoing unit size must be carried out 32×32 times, and the image data must be transferred from discontinuous addresses (see FIG. 9). The image data transferred according to the discontinuous addressing are written into the SRAM 136 in such a manner that the image data rotated by a desired angle are obtained at reading. For example, in the case of the 90-degree counterclockwise rotation, the image data transferred are written in the Y direction as illustrated in FIG. 10. Reading out in the X direction at the reading, the image is rotated. After completing the 32 pixel×32 line image rotation (writing into the SRAM 136), the image rotating section 801 reads the image data from the SRAM 136 according to the foregoing reading method, and transfers the image to the bus controller 113.

Receiving the image data passing through the rotation processing, the bus controller 113 transfers the data to the DRAM 116 or devices on the I/Fs with the continuous addressing. The series of the processings are repeated until the processing requests from the CPU 112 become zero (until completing the processings for the required number of pages).

<Image Scaling Section>

A processing procedure of the image scaling section 802 will be described below.

The CPU 112 carries out settings for the image scaling control to the bus controller 113 via the I/F 137. According to the settings, the bus controller 113 makes the settings necessary for the image scaling (such as the scaling rate in the main scanning direction, the scaling rate in the subscanning direction, and the image size after the scaling) to the image scaling section 802. After the settings needed, the CPU 112 again enables the bus controller 113 to transfer the image data. In response to the permission, the bus controller 113 starts the image data transfer from the DRAM 116 or from the devices connected via the respective I/Fs. The image scaling section 802 temporarily stores the received image data in the SRAM 136. Using the SRAM 136 as an input buffer, the image scaling section 802 enlarges or reduces the image by interpolating the pixels and lines needed according to the scaling rates in the main scanning and subscanning directions of the stored data, thereby achieving the scaling processing. The data after the scaling are written into the SRAM 136 again. Using the SRAM 136 as an output buffer, the image scaling section 802 reads the image data from the SRAM 136, and transfers the image data to the bus controller 113. Receiving the image data passing through the scaling processing, the bus controller 113 transfers the data to the DRAM 116 or devices on the I/Fs.

<Color Space Converting Section>

A processing procedure in the color space converting section 803 will be described below. The CPU 112 carries out settings for the color space conversion control in the bus controller 113 via the I/F 137. According to the settings, the bus controller 113 makes the settings necessary for the color space conversion (such as coefficients of a matrix operation which will be described later, and table values of an LUT 804) to the color space converting section 803 and LUT (lookup table) 804. After the settings needed, the CPU 112 again enables the bus controller 113 to transfer the image data. In response to the permission, the bus controller 113 starts the image data transfer from the DRAM 116 or from the devices connected via the respective I/Fs.

The color space converting section 803 first carries out the 3×3 matrix operation given by the following expression for each pixel of the image data received.

$$\begin{pmatrix} X \\ Y \\ Z \end{pmatrix} \begin{pmatrix} a11 & a12 & a13 \\ a21 & a22 & a23 \\ a31 & a32 & a33 \end{pmatrix} \begin{pmatrix} R+b1 \\ G+b2 \\ B+b3 \end{pmatrix} + \begin{pmatrix} c1 \\ c2 \\ c3 \end{pmatrix}$$

In the foregoing expression, R, G, B are the input, X, Y, Z are the output, and a11, a12, a13, a21, a22, a23, a31, a32, a33, b1, b2, b3, c1, c2, c3 are coefficients. The operation of the foregoing expression makes it possible to perform various types of color space conversions such as a conversion from the RGB color space to the Yuv color space.

Applying the conversion by the LUT 804 to the data after the matrix operation enables a nonlinear conversion. It is obvious that no LUT conversion is performed in practice by setting a through table (through which input values are output without change). After that, the color space converting section 803 transfers the image data passing through the color space conversion to the bus controller 113. Receiving the image data passing through the color space conversion, the bus controller 113 transfers the data to the DRAM 116 or devices on the I/Fs.

<Image Binarization Section>

A processing procedure of the image binarization section 805 will be described below. The CPU 112 carries out settings for the binarization control to the bus controller 113 via the I/F 137. According to the settings, the bus controller 113 makes the settings necessary for the binarization processing (various types of parameters meeting the conversion method) to the image binarization section 805. After the settings needed, the CPU 112 again enables the bus controller 113 to transfer the image data. In response to the permission, the bus controller 113 starts the image data transfer from the DRAM 116 or from the devices connected via the respective I/Fs.

The image binarization section 805 performs the binarization processing of the received image data. The present embodiment uses the binarization technique that simply carries out the binarization by comparing the image data with a prescribed threshold value. It is obvious that any of the techniques are applicable such as dithering, error diffusion method and improved error diffusion method. Subsequently, the image binarization section 805 transfers the image data passing through the binarization processing to the bus controller 113.

Receiving the image data passing through the binarization processing, the bus controller 113 transfers the data to the DRAM 116 or devices on the I/Fs.

<Sequence of PDL Image Output>

Figure 11:
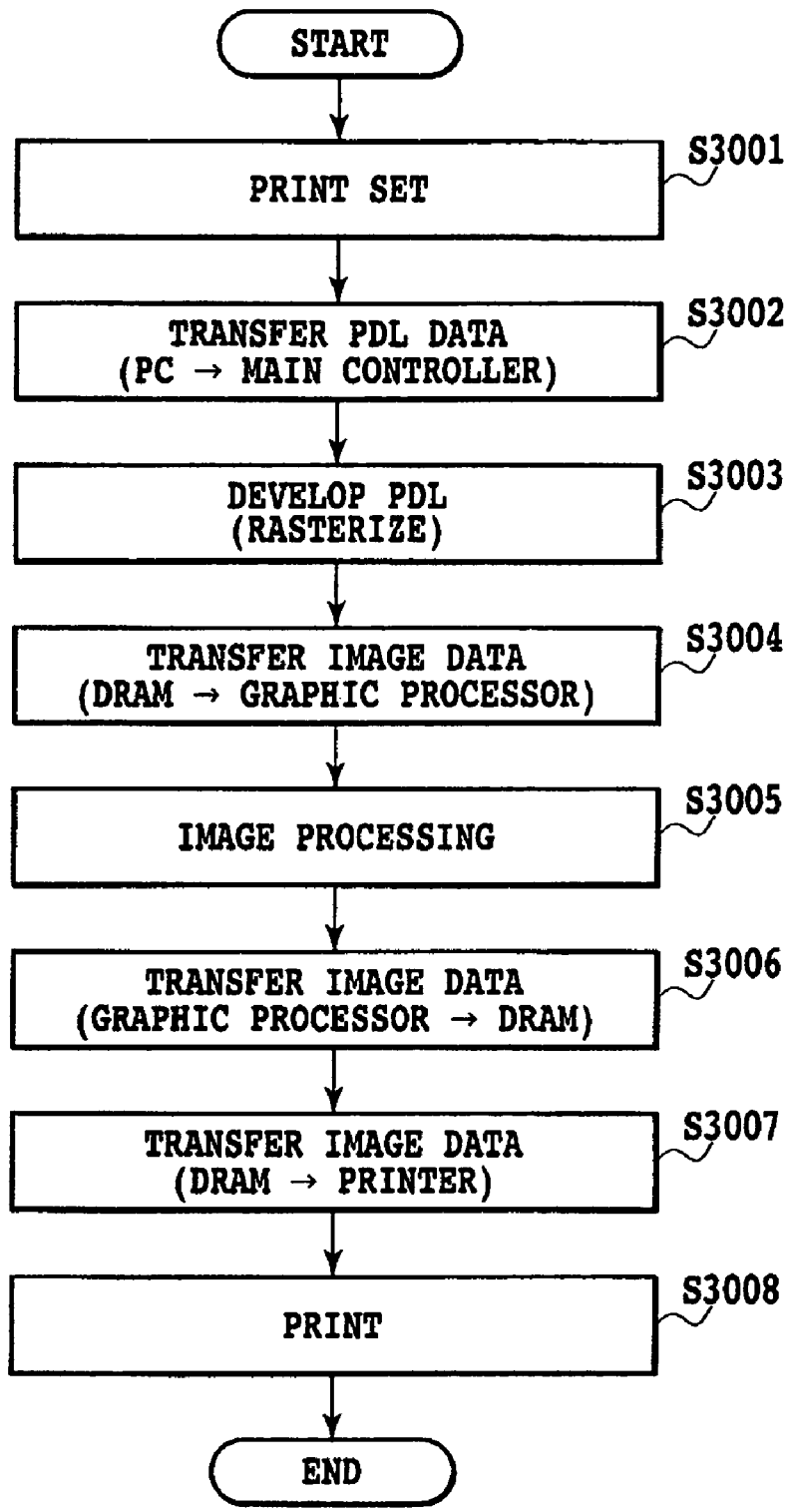
FIG. 11 is a flowchart illustrating the sequence at the PDL image output of the embodiment in accordance with the present invention.
Figure 12:
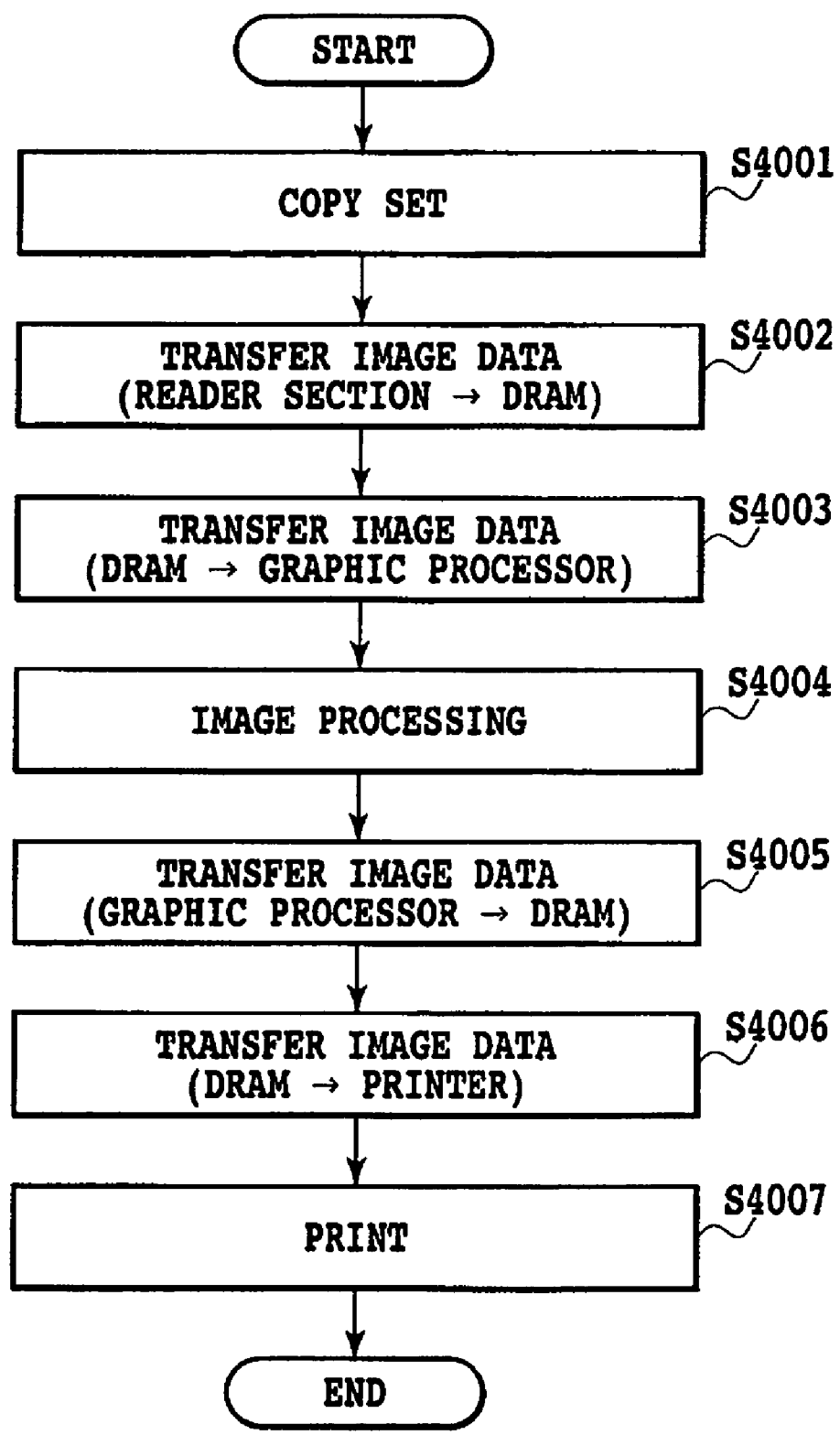
FIG. 12 is a flowchart illustrating the sequence at the copy image output of the embodiment in accordance with the present invention.

FIG. 11 is a diagram illustrating a procedure of the PDL image output in the present embodiment. In FIG. 11, the reference symbols S3001-S3008 each designate a step of the processing. To output a PDL image, a user carries out on a PC 411 the print settings of the PDL image output job at step S3001. The contents of the print settings are the number of copies, paper size, single-sided/double-sided printing, page output order, sort output, and the presence or absence of stapling.

At step S3002, a print instruction is given on the PC 411. At the same time, the driver software installed in the PC 411 converts the code data on the PC 411, which are an object to be printed, to PDL data. Then, together with the print setting parameters set at step S3001, the PDL data are transferred to the controller section 110 of the image input/output unit via the network 400.

The CPU 112 of the main controller 111 of the controller section 110 develops (rasterizes) the PDL data transferred via the connector 122 and Network Controller 121 to image data according to the print setting parameters (S3003). The development of the image data is carried out on the DRAM 116. When the development of the image data has been completed, the processing proceeds to step S3004.

At step S3004, the main controller 111 transfers the image data developed on the DRAM 116 to the Graphic Processor 135. At step S3005, the Graphic Processor 135 performs the image processing independently of the print setting parameters. For example, in the case where the paper feed unit 360 of the printer section 300 has only A4R paper even though the paper size designated by the print setting parameters is A4, the Graphic Processor 135 rotates the image by 90 degrees so that the image output matching the output paper is achieved. When the image processing of the image data has been completed, the processing proceeds to step S3006.

At step S3006, the Graphic Processor 135 transfers the image data after the image processing to the main controller 111. The main controller 111 stores the transferred image data in the DRAM 116. At step S3007, while controlling the printer section 300 via the printer I/F 145 and connector 147, the main controller 111 transfers the image data on the DRAM 116 to the printer section 300 at proper timing.

At step S3008, the controller section 110 controls the printer section 300 to print and output the image data. After completing the transfer of the image data, that is, completing the PDL job, the print output is terminated.

Figure 13:
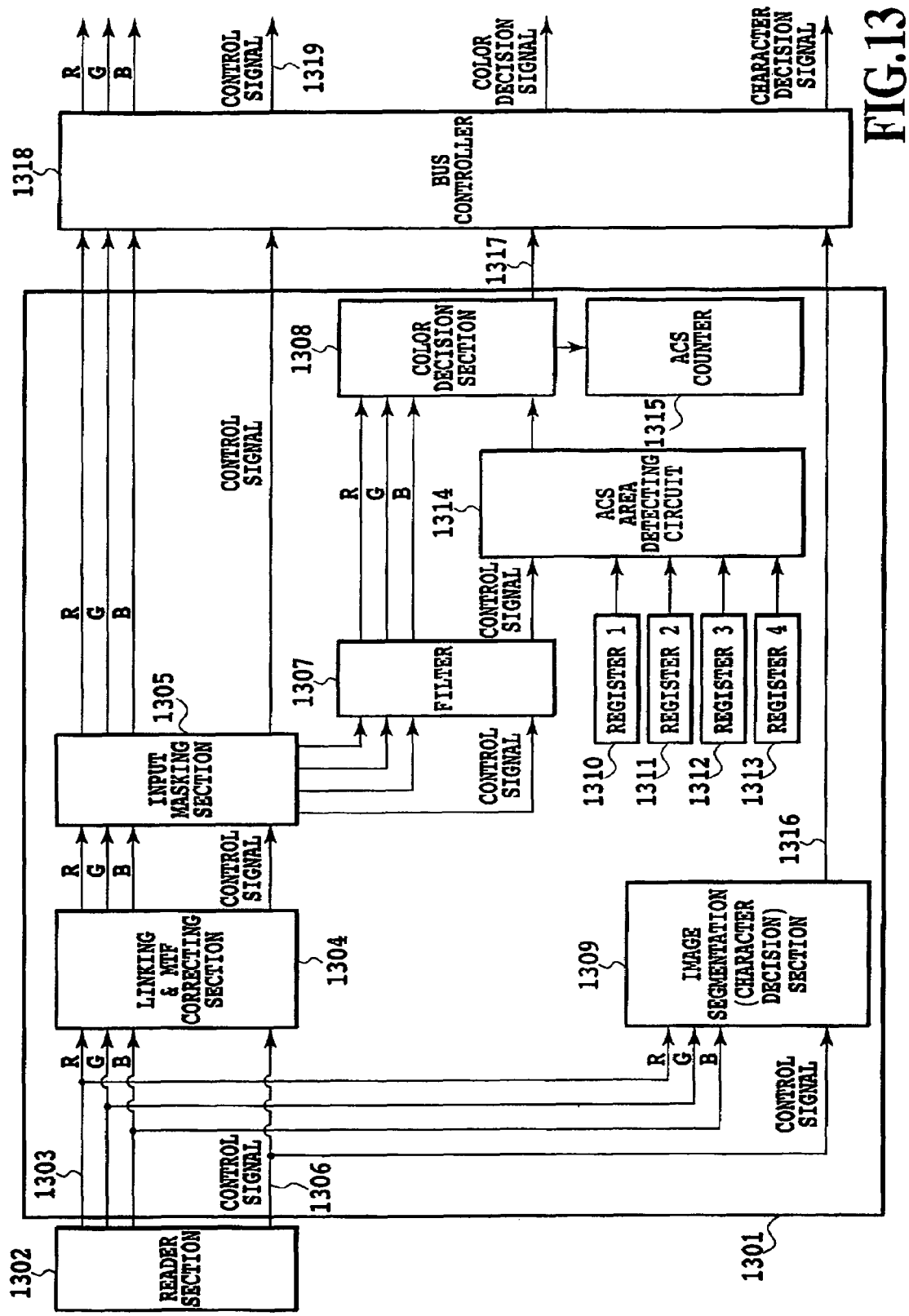
FIG. 13 is a block diagram showing a configuration of a scanner I/F for making an image area decision (character decision) and color decision of the image data that are read by a reader image processing section 222 of the embodiment in accordance with the present invention and are converted to RGB signals.

FIG. 13 is a diagram showing a circuit configuration of a scanner I/F for making an image are a decision (character decision) and color decision of the image data that are read by the reader image processing section 222 of FIG. 3 and are converted to the RGB signals. The digital image data read by the reader section 1302 are fed to the scanner I/F 1301 via the image data signal line 1303.

The digital image data transmitted through the image data signal line 1303 are supplied to an image area at ion (character decision) section 1309 from the image data signal line 1303 while establishing synchronization in response to the control signal line 1306 from the reader section 1302. Here, the image area at ion (character decision) section 1309 makes a decision as to whether the image data input via the image data signal line 1303 are acquired by reading a character portion of the document or a photograph or picture portion thereof. When the image data are acquired from the character portion of the document, the image area at ion (character decision) section 1309 makes "true" the character decision signal line 1316.

The image data input via the image data signal line 1303 simultaneously with the foregoing processing are subjected to the correction by a linking & MTF correcting section 1304, followed by the enhancement by an input masking section 1305. At the same time, the image data are input to a color decision section 1308 via a filter 1307. Then, according to the ACS decision area set in the register 1 (1310), register 2 (1311), register 3 (1312) and register 4 (1313), an ACS decision area detecting circuit 1314 makes a color decision of the area decided as an ACS decision area. When the color decision section 1308 decides that the input pixel is a chromatic color, the color decision section 1308 has an ACS counter 1315 count up, and at the same time makes a color decision signal line 1317 "true".

The information on the character decision signal line 1316 and the information on the color decision signal line 1317 are processed as the image area information for the image supplied through the image data signal line 1303.

Figure 14:
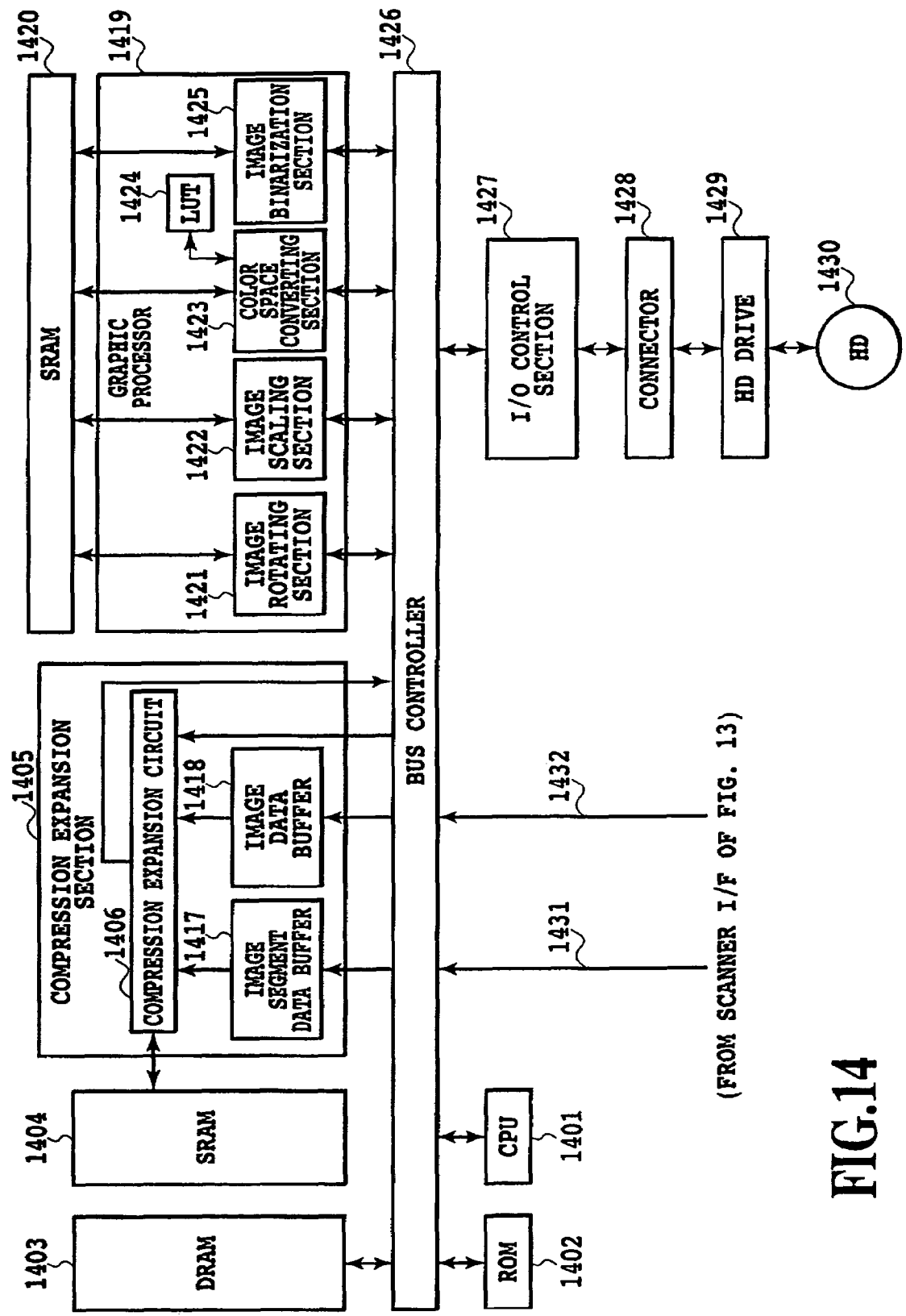
FIG. 14 is a block diagram showing a processing that compresses and stores in a DRAM the image data that are read by the reader image processing section of the embodiment in accordance with the present invention and are converted to RGB signals, and the information on a character decision signal line generated by an image area at ion section and the information on a color decision signal line generated by a color decision section as the image area information.
Figure 15:
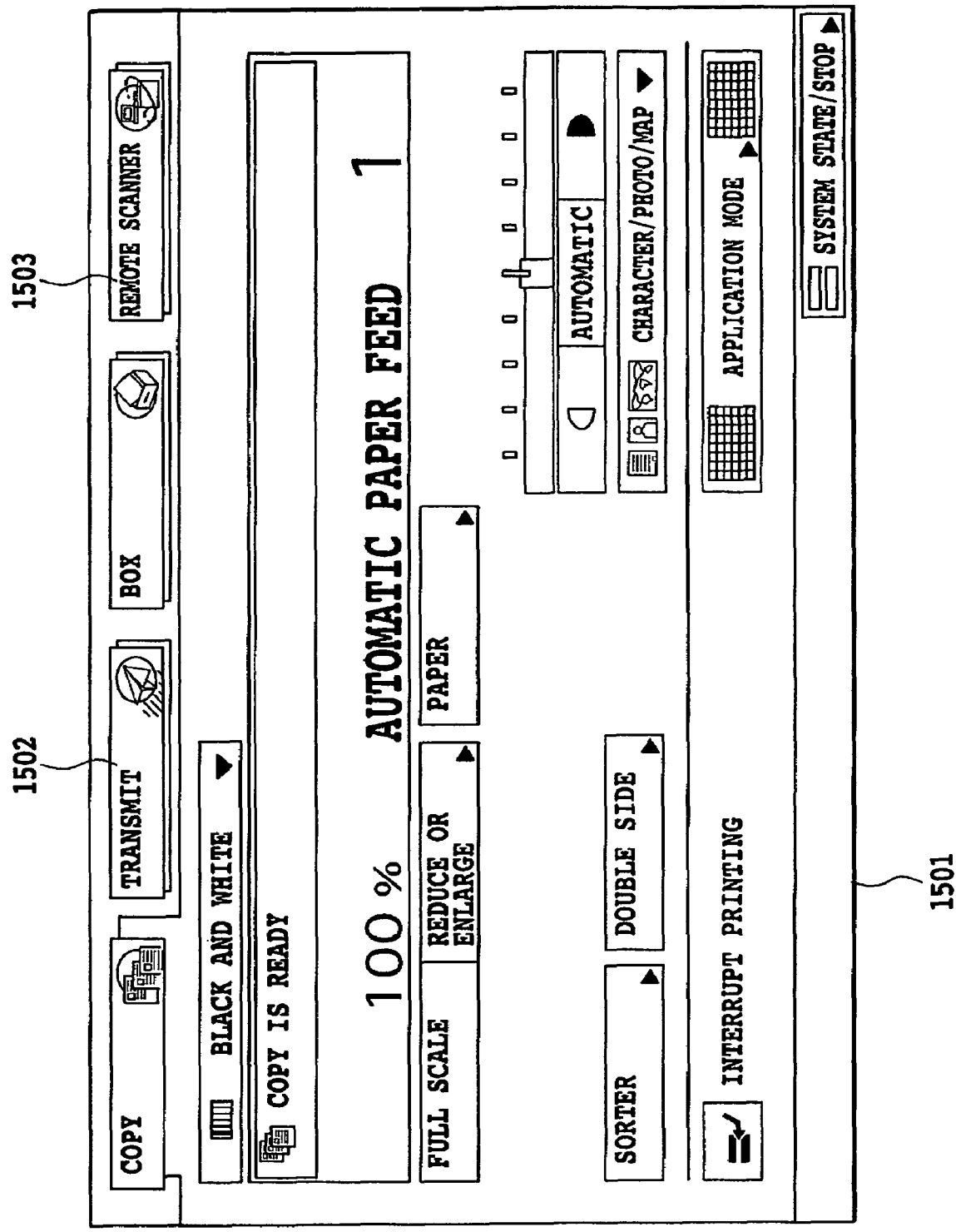
FIG. 15 is a view showing an input screen of the embodiment in accordance with the present invention.
Figure 16:
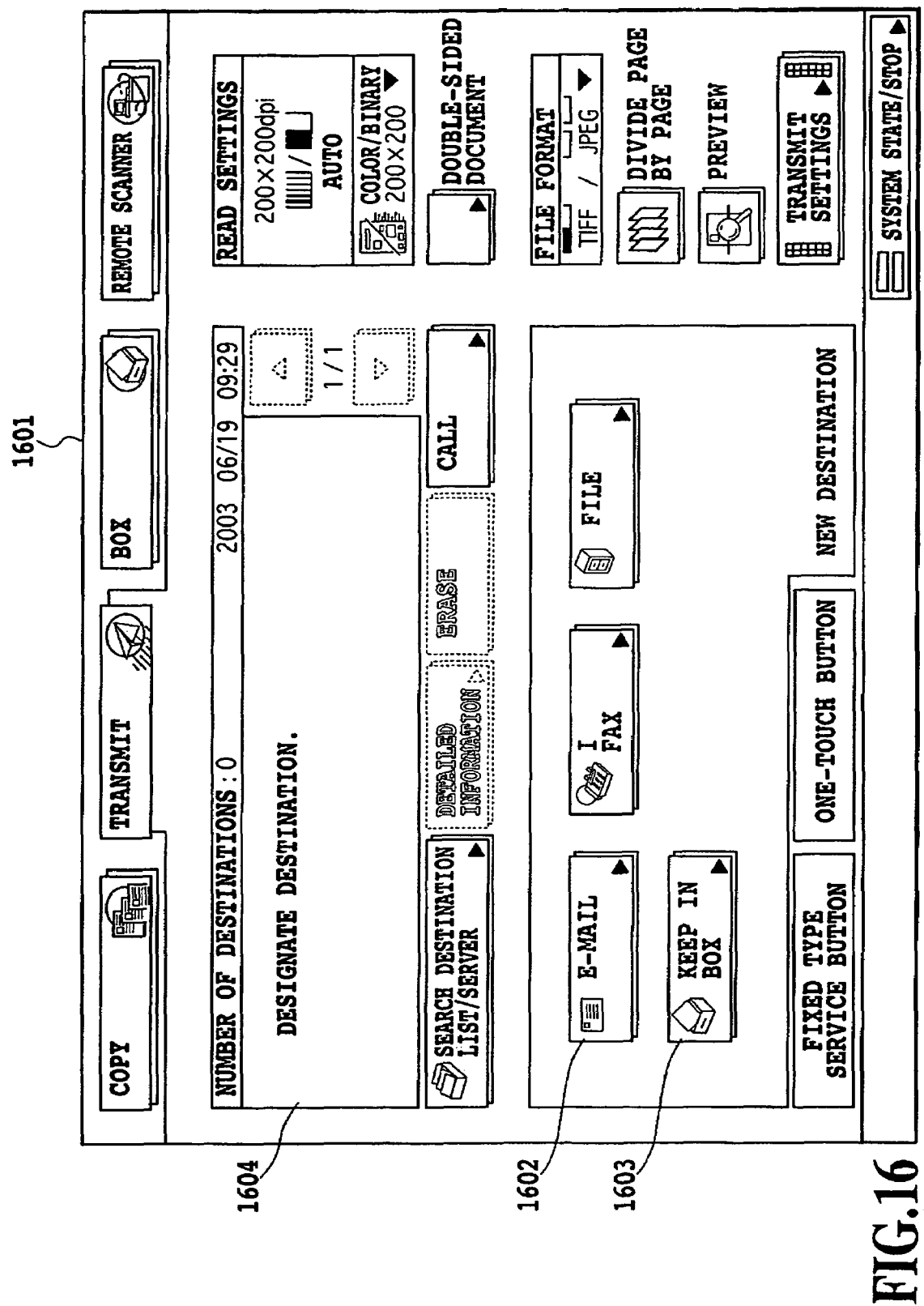
FIG. 16 is a view showing an input screen of the embodiment in accordance with the present invention.
Figure 17:
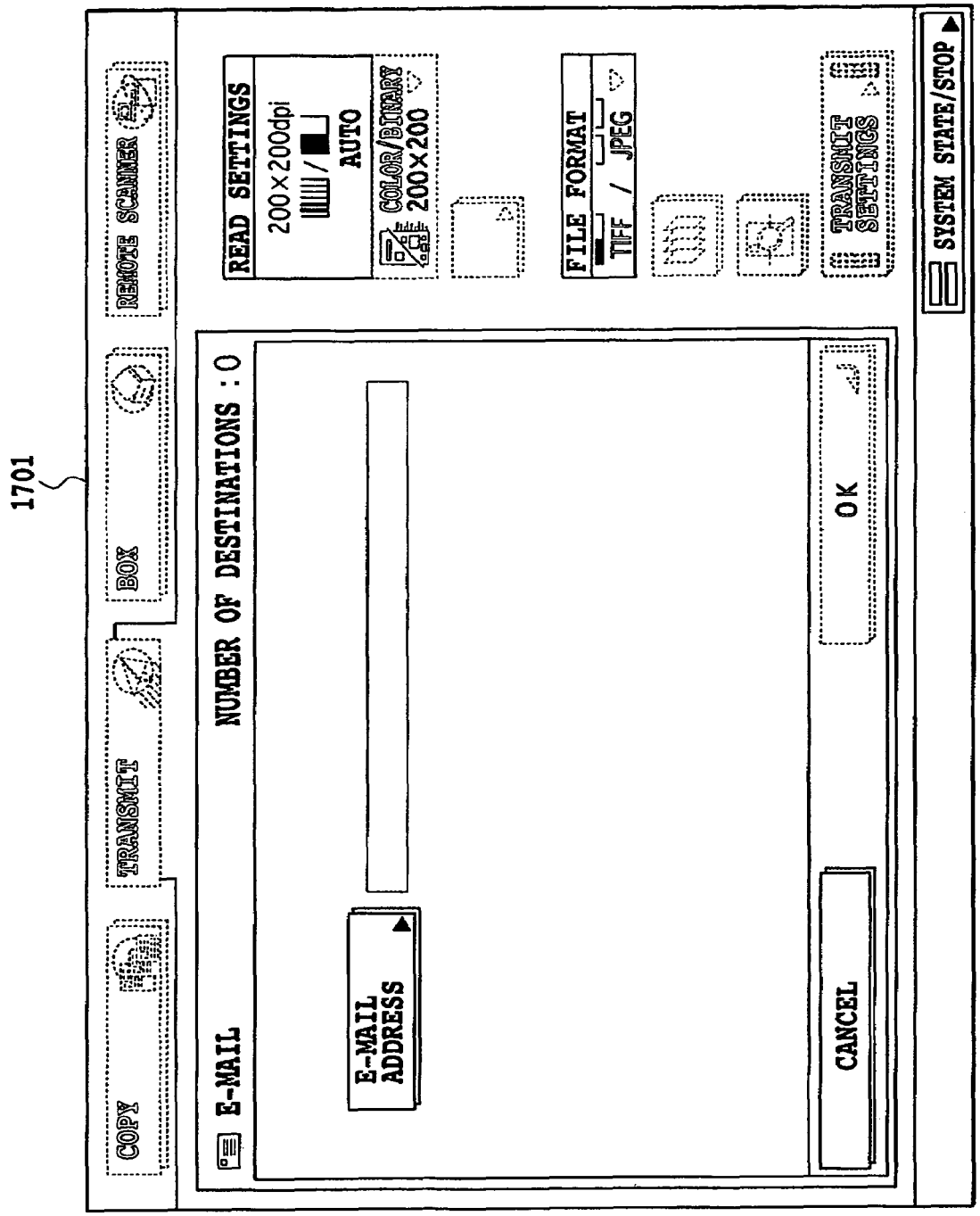
FIG. 17 is a view showing an input screen of the embodiment in accordance with the present invention.
Figure 18:
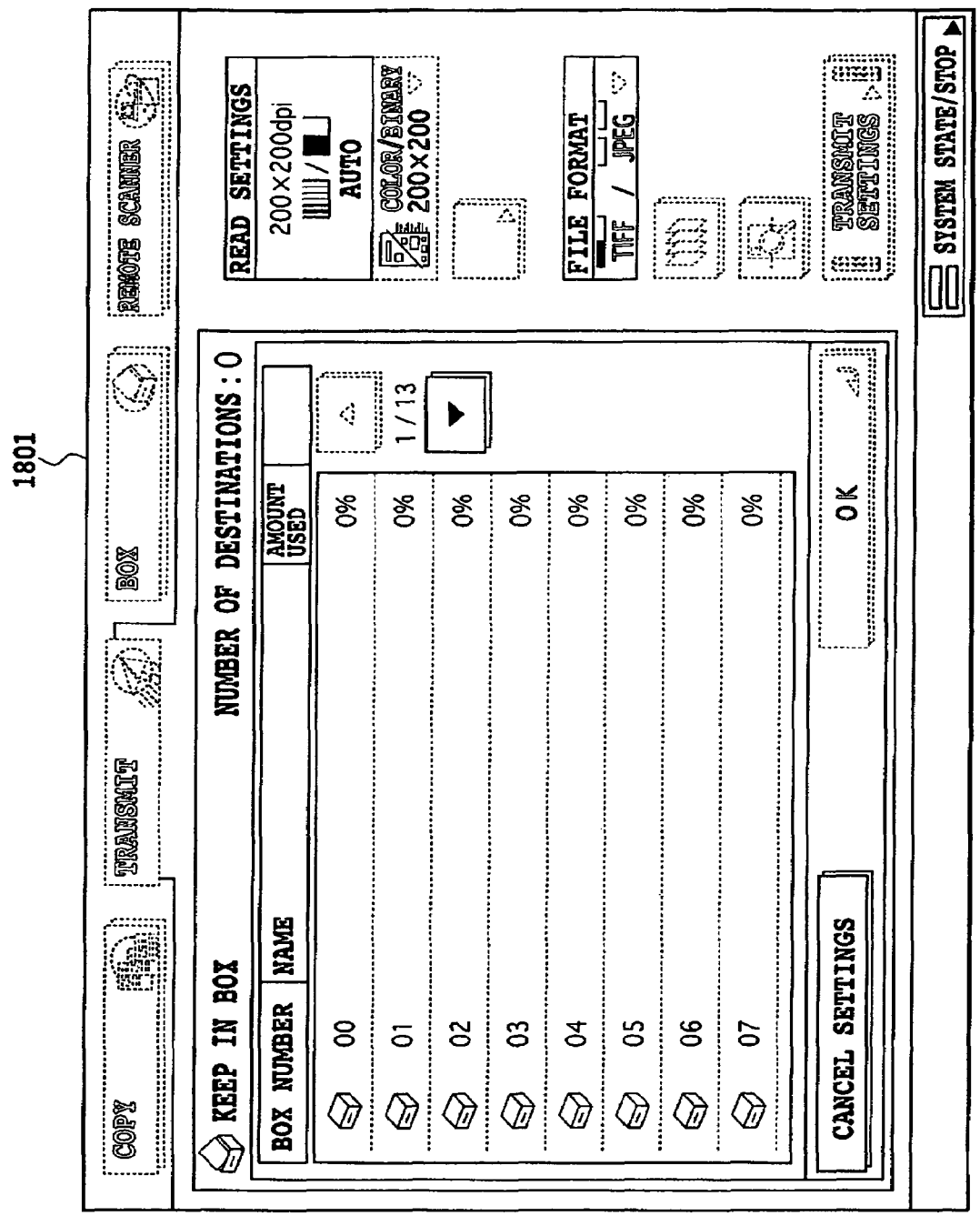
FIG. 18 is a view showing an input screen of the embodiment in accordance with the present invention.

FIG. 14 is a diagram illustrating a processing for storing the compressed data into the DRAM 116 of FIG. 4. Here, the compressed data are obtained by compressing the image data which are read by the reader image processing section 222 of FIG. 3 and converted to the RGB signals using as the image area information the information on the character decision signal line 1316 generated by the image area at ion section 1309 and the information on the color decision signal line 1317 generated by the color decision section 1308. The image data input fro the reader section 1302 are subjected to the image area decision (character decision) by the image area at ion section 309 of the scanner I/F 1301, and then input via the bus controller section 1318 (1426 of FIG. 14). Here, the image data are input to an image compression expansion section 1405 along with the information on the character decision signal line 1316 obtained as a result of the image area at ion section 1309, the information on the color decision signal line 1317 and the control signal 1319. In synchronism with the control signal 1319, the image data are input to the image data buffer 1418, and the information on the character decision signal line 1316 and the information on the color decision signal line 1317 are input to the image area data buffer 1417. At the time when the 32-line image data and image area information are stored in the image data buffer 1418 and image area data buffer 1417, the compression circuit 1406 compresses the image data and image area information using the SRAM 1404. The compressed data are temporarily stored in the DRAM 1403 via the bus controller 1426, and are supplied to an I/O control section 1427 by the CPU 1401 via a bus controller 1426. Then, the compressed data are transferred to an HD 1430 via an HD drive 1429 connected to the I/0 control section 1427 via a connector 1428.

Figure 19:
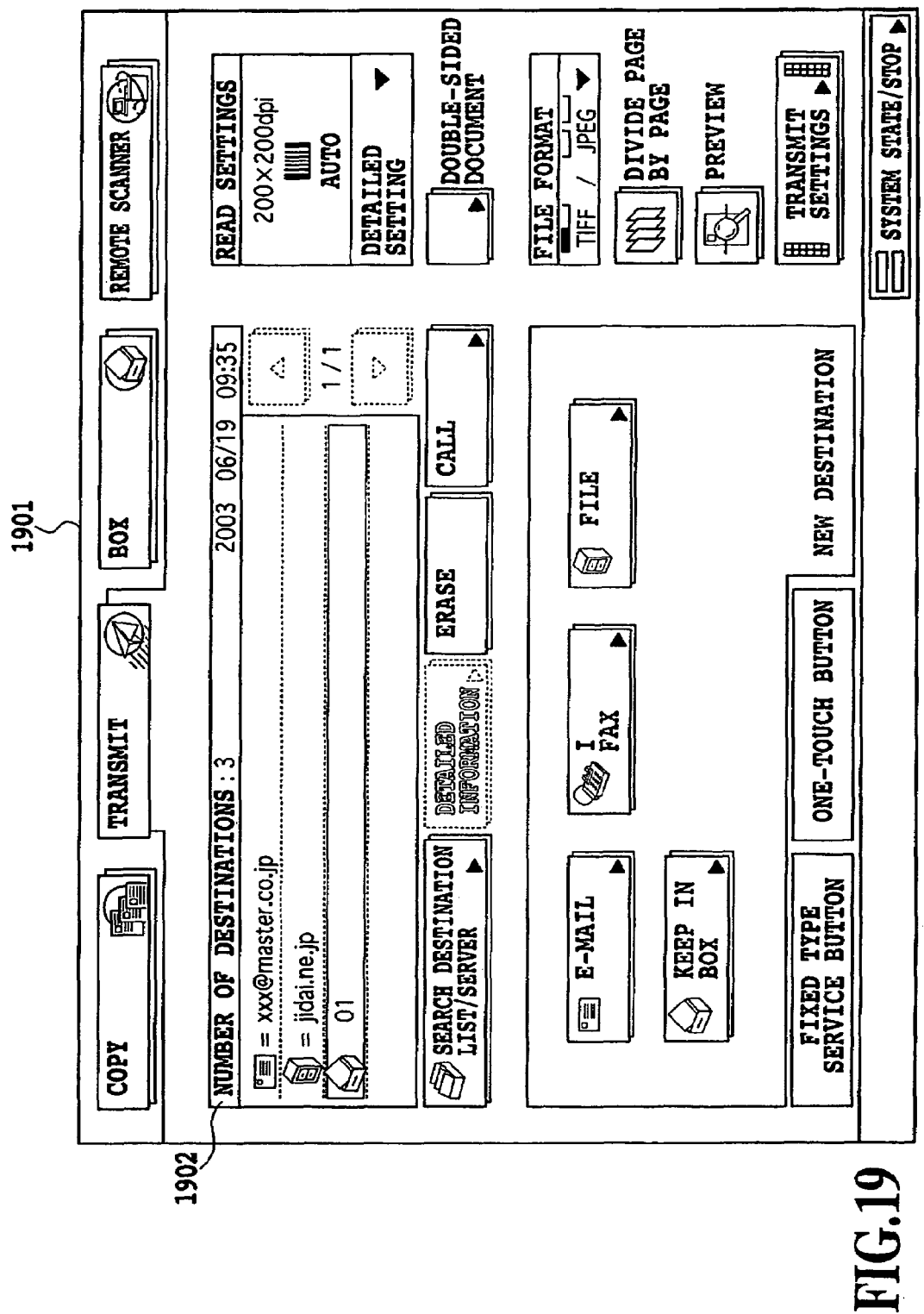
FIG. 19 is a view showing an input screen of the embodiment in accordance with the present invention.
Figure 20:
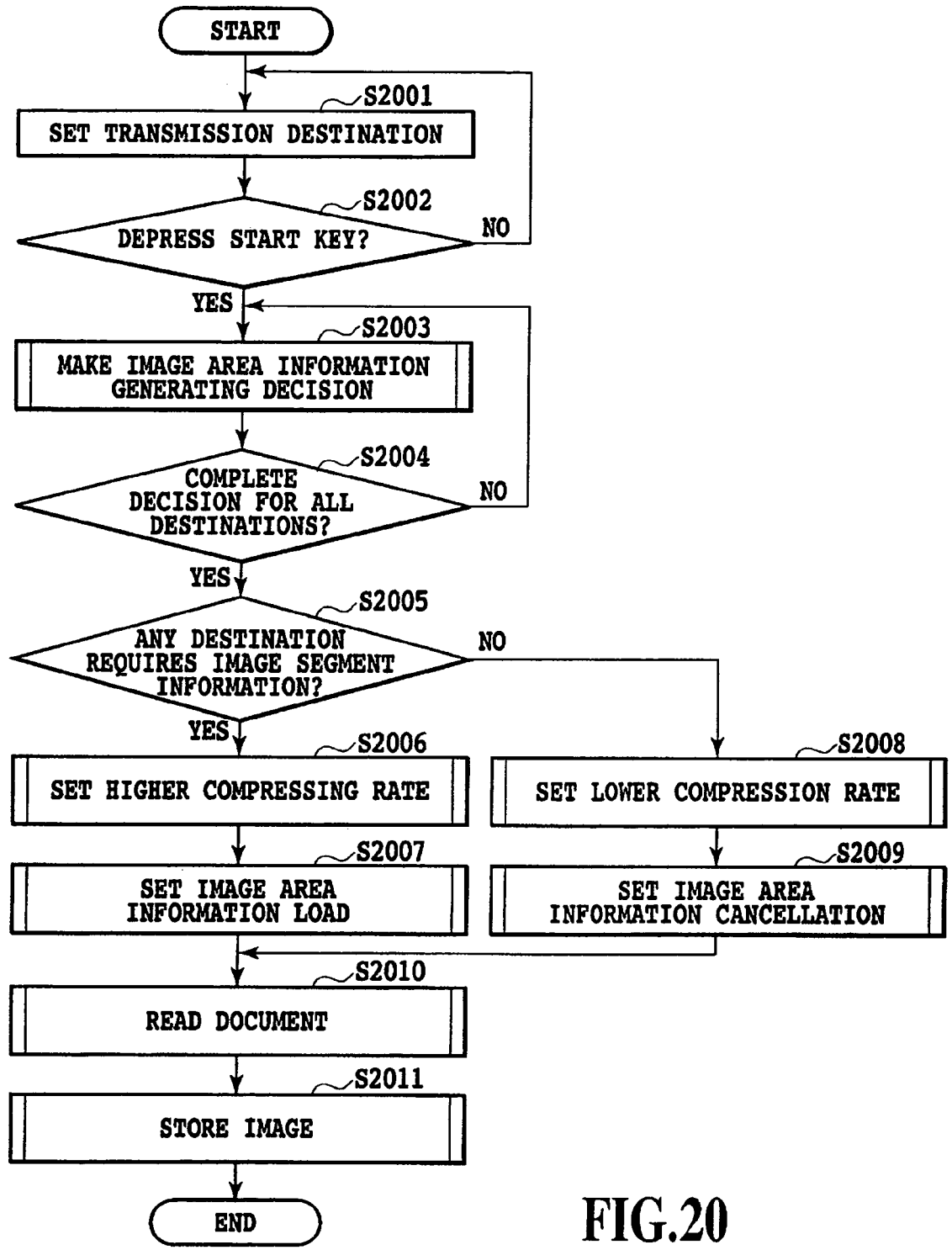
FIG. 20 is a flowchart illustrating control of the embodiment in accordance with the present invention.
Figure 21:
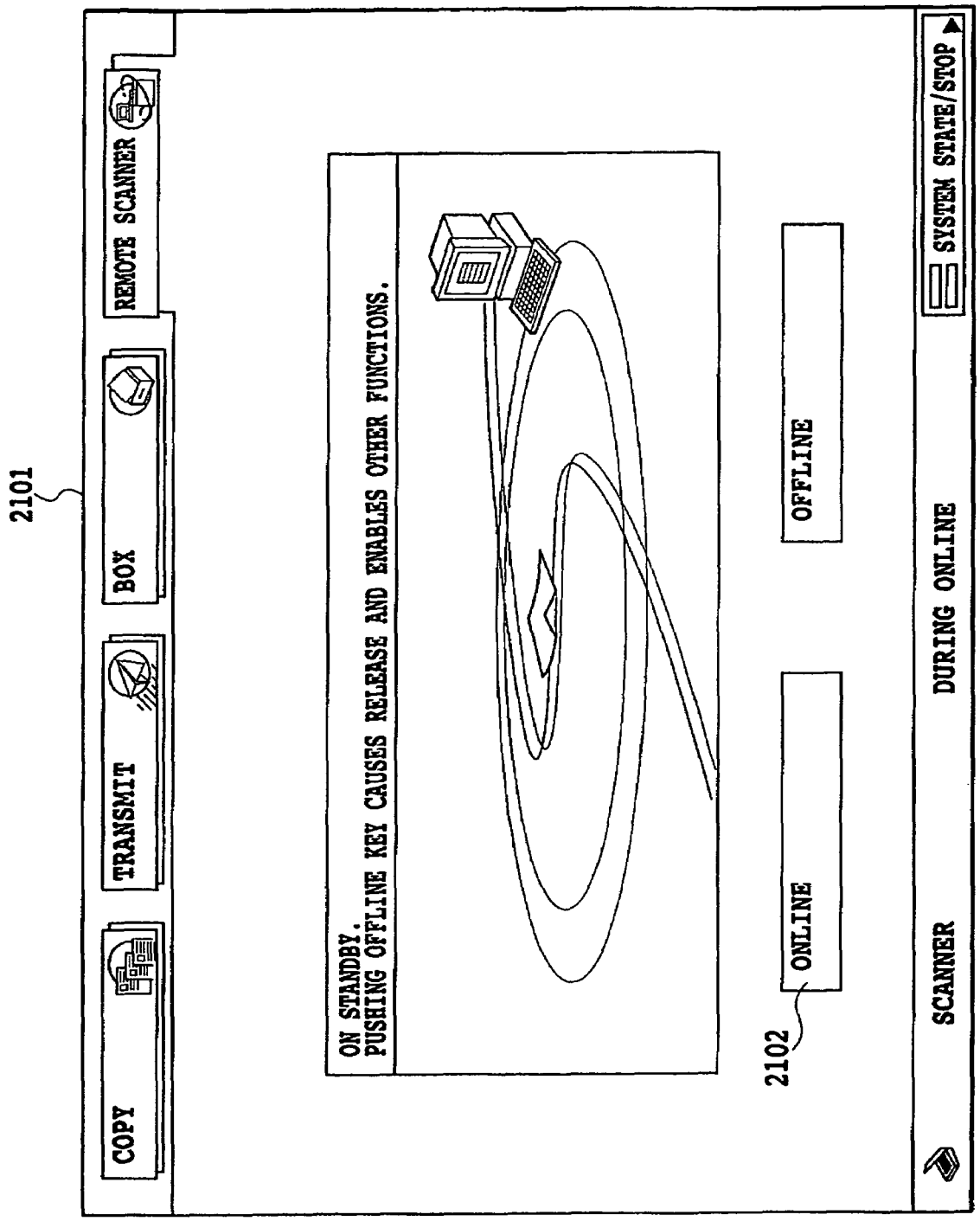
FIG. 21 is a view showing an input screen of the embodiment in accordance with the present invention.

Next, referring to a flowchart of FIG. 20, the control of the present embodiment will be described. When the user carries out the read and transmission of a document or storing processing of a read image, the user must depress a "transmission" button 1502 on a primary screen 1501 displayed on the operating section 150 to display a transmission setting screen 1601, and carry out various settings such as a transmission method. When the user depresses an "e-mail" button 1602 on the transmission setting screen 1601, an e-mail address setting screen 1701 is displayed. Likewise, when the user depresses a "keep in box" button 1603 on the transmission setting screen 1601, a box storing setting screen 1801 is displayed. Settings on the respective setting screens are made in such a manner that a destination denotation 1604 on the transmission setting screen 1601 is represented as a destination denotation 1902 of FIG. 19 (S2001).

Here, when the user depresses the start button on the operating section 150 (S2002), the CPU 1401 searches destinations that are set sequentially. Subsequently, an image area information generating decision (S2003) is made for the individual destinations for searching for the destination that requires the image area information.

Assume here that the destination that requires the image area information is, for example, the printer section 300 that possibly prints the image data, and the destination that does not require the image area information is the computer that never prints the image data.

When the image area information generating decision (S2003) has been completed for all the destinations (S2004), the CPU 1401 makes a decision as to whether it is necessary to generate the image area information in the end (S2005). When a decision is made that the image area information should be generated, the compression expansion circuit 1406 of the image compression expansion section 1405 is set at a higher compression rate (S2006), and at the same time the output of the image area data buffer is enabled (S2007). When a decision is made that there is no need for the image area information to be generated, the compression expansion circuit 1406 of the image compression expansion section 1405 is set at a lower compression rate (S2008), and at the same time the output of the image area data buffer is disabled (S2009). After carrying out the foregoing processing, the CPU 1401 reads a document (S2010), and then carries out the image storing processing (S2011). Thus, the image data, which have the compression rate decided from the destination set by the user, and which reflect the setting as to the necessity of the image area information are stored in the HD 1430.

When outputting the image data stored in the HD 1430 to the printer 300, the compressed image data and image area information stored in the HD 1430 are transferred to the DRAM 1403 via the bus controller 1426. Then, the image data and image area information from the DRAM 1403 are expanded through the image compression expansion section 1405, and are subjected to the image processing through the image rotating section 1421, image scaling section 1422, and color space converting section 1423 of the Graphic Processor 1419. In addition, the image data are subjected to the optimum processing for the printing by the LOG converting section 701, moirë eliminating section 702, UCR&masking section 703, γ correcting section 704, and filter section 705 of the printer I/F 145, and are output to the printer section 300 via the connector 147. In the course of this, the image area information is referred to by the UCR&masking section 703 and filter section 705 to perform the optimum processing on the image data.

When transmitting the image data stored in the HD 1430 to the PC 411 and PC 412 connected to the LAN 400 via the LAN 400, the compressed image data stored in the HD 1430 are once transferred to the DRAM 1403 via the bus controller 1426. Subsequently, the image data from the DRAM 1403 are expanded through the image compression expansion section 1405. Then, the image data are subjected to the image processing by the image rotating section 1421, image scaling section 1422, color space converting section 1423, and image binarization section 1425 of the Graphic Processor 1419, followed by the recompression by the image compression expansion circuit 1405. After that, the image data are transferred to the PC 411 and PC 412 connected to the LAN 400 via the Network Controller 121.

Thus, the efficient use of the image memory area becomes possible according to the processing contents set by the user.

Second Embodiment

Figure 22:
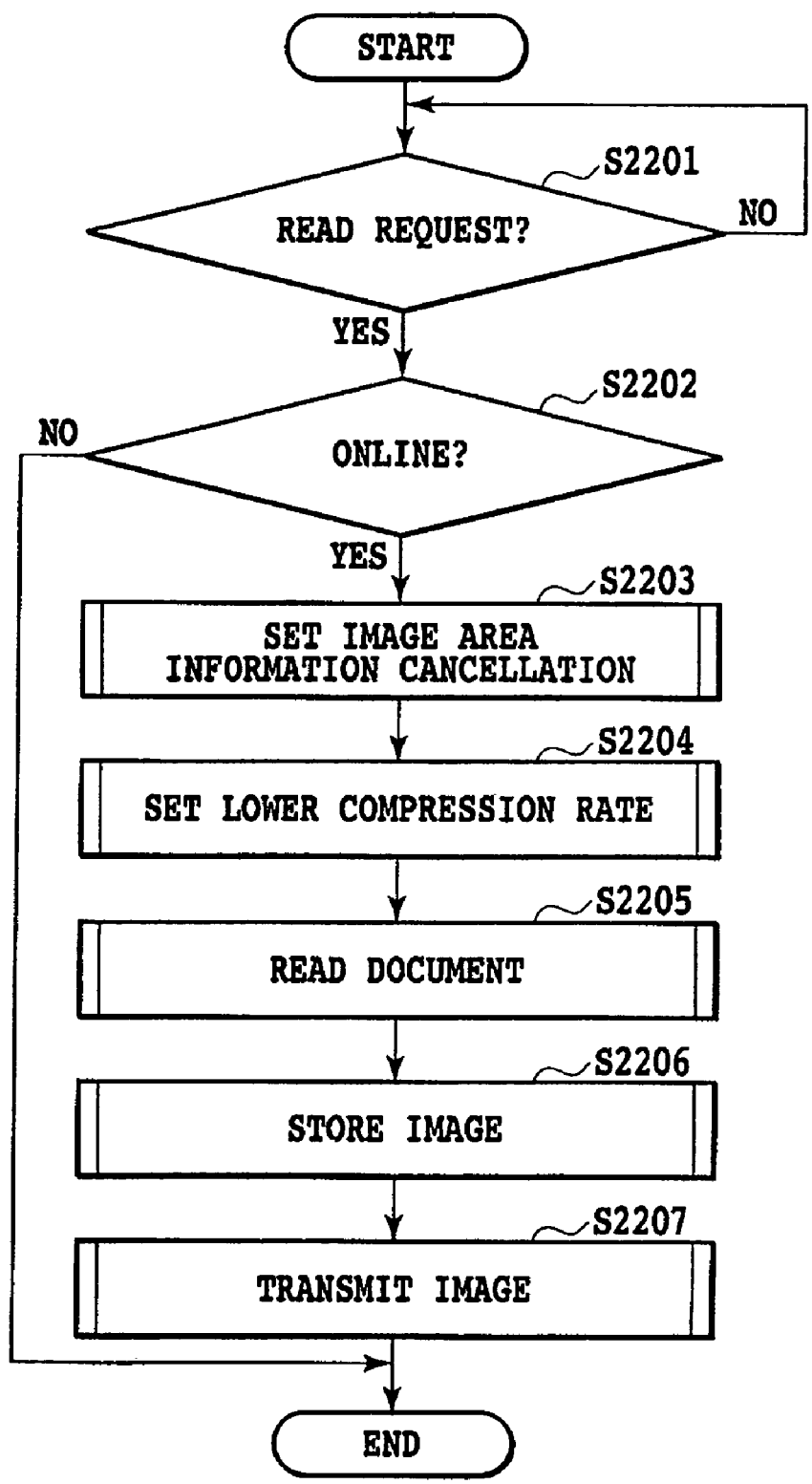
FIG. 22 is a flowchart illustrating control of the embodiment in accordance with the present invention.

Next, referring to a flowchart shown in FIG. 22, the processing will be described at the time when receiving an image read request from the PC 411 or PC 412 on the LAN 400, which generates and transmits the image data. As for the image read request from the PC 411 or PC 412, the CPU 1401 receives it from the LAN 400 via the Network Controller 121. When the CPU 1401 detects the image read request from the PC 411 or PC 412 on the LAN 400 (S2201), it checks whether a "remote scanner" button 1503 on the operation screen 1501 displayed on the operating section 150 is depressed or not. In addition, when the "remote scanner" button 1503 is depressed, the CPU 1401 checks whether an "online" button 2102 on the operation screen 2101 displayed on the operating section 150 is depressed or not (S2202). When the "online" button 2102 is depressed, the CPU 1401 annuls the output of the image area data buffer 1417 of the image compression expansion section 1405 (S2203), and at the same time sets the compression rate of the compression expansion circuit 1406 at a lower compression rate (S2204).

After completing the foregoing processing, the CPU 1401 reads the document (S2205), and then carries out the image storing processing (S2206). After the compressed image data are stored in the HD 1430, the compressed image data stored in the HD 1430 are transmitted to the PC 411 and PC 412 on the LAN 400 using the Network Controller 121 (S2207).

Thus, as to the image data to which the transmission request is made from the PC or the like connected to the LAN, an automatic decision is made that the image area information is not generated. Accordingly, it is possible to offer data that are compressed at a lower compression rate and has a higher quality.

As described above, the present invention can provide an image generating apparatus and image data processing method capable of using the image memory area efficiently according to the processing contents set by the user.

Although various embodiments have been described, the present invention is not limited to the apparatus and method for implementing the foregoing embodiments. It is also possible to install program code of software for implementing the foregoing embodiments in the computer (CPU or MPU) in the foregoing system or apparatus. These systems that implement the foregoing embodiments by causing the computer of the foregoing system or apparatus to operate the devices according to the program code also fall within the category of the present invention.

In this case, the program code of the software itself implements the function of the foregoing embodiments. In this case, the program code itself, and a means for installing the program code into the computer, that is, the storage medium storing the program code also fall within the category of the present invention.

As a storage medium for storing the program code, it is possible to use a floppy disk, hard disk, optical disk, magneto-optical disk, CD-ROM, magnetic tape, nonvolatile memory card, ROM or the like.

In addition, when the computer implements the functions of the foregoing embodiments by controlling the devices according to only the installed program code, the program code falls within the category of the present invention. Besides, when the program code implements the foregoing embodiments in combination with an OS (operating system) or with other applications working on the computer, the program code also falls within the category of the present invention.

Furthermore, the case, in which the installed program code is stored in a memory in a function expansion board of the computer or in a function expansion unit connected to the computer, and then the foregoing embodiments are implemented by the CPU in the function expansion board or function expansion unit, which CPU carries out part or all of the actual processing according to the instructions of the program code, also falls within the category of the present invention.

Moreover, a configuration including at least one of the variety of features described above also falls within the category of the present invention.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes.

This application claims priority from Japanese Patent Application No. 2005-064402 filed Mar. 8, 2005, which is hereby incorporated by reference herein.

What is claimed is:

1. An image processing apparatus comprising:
   reading means for reading image data;
   image area information generating means for producing image area information from the image data;
   compression means for compressing the image data;
   storing means for storing the compressed image data;
   setting means for setting a transmission destination to which the image data is transmitted;
   decision means for making a decision as to whether the image area information is necessary or not according to the transmission destination that is set; and
   control means for controlling, when said decision means makes a decision that the image area information is not necessary, said compression means in such a manner as to compress the image data at a compression rate lower than a compression rate when a decision is made that the image area information is necessary, wherein said decision means makes a decision that the image area information is not necessary when the transmission destination will never print the image data.

2. The image processing apparatus as claimed in claim 1, wherein said transmission destination that will never print the image data is a computer.

3. The image processing apparatus as claimed in claim 1, wherein said control means controls, when said decision means makes a decision that the image area information is not necessary, said image area generating means in such a manner as to not generate the image area information.

4. The image processing apparatus as claimed in claim 3, wherein said control means controls, when said decision means makes a decision that the image area information is not necessary, in such a manner as to store the image area information generated by said image area generating means in said storing means.

5. The image processing apparatus as claimed in claim 1, wherein said control means controls, when said decision means makes a decision that the image area information is necessary, said image area generating means in such a manner as to generate the image area information.

6. An image processing method comprising:
   a reading step of reading image data;
   an image area information generating step of producing image area information from the image data;
   a compression step of compressing the image data;
   a step of storing the compressed image data in storing means;
   a step of setting a transmission destination to which the image data is transmitted;
   a decision step of making a decision as to whether the image area information is necessary or not according to the transmission destination that is set; and
   a control step of controlling, when the decision step makes a decision that the image area information is not necessary, the compression step in such a manner as to compress the image data at a compression rate lower than a compression rate when a decision is made that the image area information is necessary, wherein the decision step makes a decision that the image area information is not necessary when the transmission destination will never print the image data.

7. The image processing method as claimed in claim 6, wherein the transmission destination that will never print the image data is a computer.

8. The image processing method as claimed in claim 6, wherein the control step controls, when the decision step makes a decision that the image area information is not necessary, the image area generating step in such a manner as to not generate the image area information.

9. The image processing method as claimed in claim 8, wherein the control step controls, when the decision step makes a decision that the image area information is not necessary, in such a manner as to store the image area information generated by the image area generating step in said storing means.

10. The image processing method as claimed in claim 6, wherein the control step controls, when the decision step makes a decision that the image area information is necessary, the image area generating step in such a manner as to generate the image area information.

11. A computer readable medium including a program for causing a computer to execute an image processing method comprising:
    a reading step of reading image data;
    an image area information generating step of producing image area information from the image data;
    a compression step of compressing the image data;
    a step of storing the compressed image data in storing means;
    a step of setting a transmission destination to which the image data is transmitted;
    a decision step of making a decision as to whether the image area information is necessary or not according to the transmission destination that is set; and
    a control step of controlling, when the decision step makes a decision that the image area information is not necessary, the compression step in such a manner as to compress the image data at a compression rate lower than a compression rate when a decision is made that the image area information is necessary, wherein the decision step makes a decision that the image area information is not necessary when the transmission destination will never print the image data.

* * * * *